(12) United States Patent
Peng

(10) Patent No.: US 10,164,457 B2
(45) Date of Patent: Dec. 25, 2018

(54) CHARGING METHOD AND APPARATUS

(71) Applicant: Huawei Technologies Co., Ltd., Shenzhen (CN)

(72) Inventor: Qi Peng, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 17 days.

(21) Appl. No.: 15/484,787

(22) Filed: Apr. 11, 2017

(65) Prior Publication Data

US 2017/0222451 A1  Aug. 3, 2017

Related U.S. Application Data

(63) Continuation of application No. PCT/CN2015/098115, filed on Dec. 21, 2015.

(30) Foreign Application Priority Data

Dec. 30, 2014  (CN) .......................... 2014 1 0843040

(51) Int. Cl.
  *H02J 7/00* (2006.01)
  *H01G 11/14* (2013.01)
  (Continued)

(52) U.S. Cl.
  CPC ................ *H02J 7/007* (2013.01); *G06F 1/26* (2013.01); *H01G 9/155* (2013.01); *H01G 9/28* (2013.01);
  (Continued)

(58) Field of Classification Search
  CPC ......... H02J 7/345; H02J 7/0016; Y02E 60/13; H01G 9/155; Y02T 10/7022
  (Continued)

(56) References Cited

U.S. PATENT DOCUMENTS

2003/0052647 A1   3/2003  Yoshida et al.
2003/0129574 A1*  7/2003  Ferriol ................. G09B 5/00
                                              434/362
(Continued)

FOREIGN PATENT DOCUMENTS

CN       101214796 A      7/2008
CN       101574932 A     11/2009
(Continued)

OTHER PUBLICATIONS

Foreign Communication From a Counterpart Application, European Application No. 15875123.0, Extended European Search Report dated Sep. 13, 2017, 13 pages.
(Continued)

*Primary Examiner* — Arun C Williams
(74) *Attorney, Agent, or Firm* — Conley Rose, P.C.

(57) ABSTRACT

A charging method and apparatus are provided. The charging method includes obtaining power supply energy needed by a storage system during a power failure, detecting a temperature of an environment in which a supercapacitor is located in order to obtain environmental temperature information of the supercapacitor, where the supercapacitor is configured to provide the power supply energy to the storage system, determining a charging voltage of the supercapacitor according to the environmental temperature information and the power supply energy, and charging the supercapacitor according to the determined charging voltage. Therefore, the supercapacitor can be charged according to an actual charging voltage of the supercapacitor such that a life of the supercapacitor is prolonged.

10 Claims, 9 Drawing Sheets

(51) Int. Cl.
*H01G 11/18* (2013.01)
*H02J 9/04* (2006.01)
*G06F 1/26* (2006.01)
*H01G 9/00* (2006.01)
*H01G 9/28* (2006.01)
*H02J 9/06* (2006.01)
*H02J 7/34* (2006.01)

(52) U.S. Cl.
CPC ............ *H01G 11/14* (2013.01); *H01G 11/18* (2013.01); *H02J 7/0091* (2013.01); *H02J 9/04* (2013.01); *H02J 9/061* (2013.01); *H02J 7/345* (2013.01); *Y02E 60/13* (2013.01)

(58) Field of Classification Search
USPC .......................................................... 320/167
See application file for complete search history.

(56) References Cited

U.S. PATENT DOCUMENTS

| | | | |
|---|---|---|---|
| 2008/0303488 A1 | 12/2008 | Khan | |
| 2010/0156359 A1 | 6/2010 | Wardensky | |
| 2010/0270859 A1 | 10/2010 | Gong et al. | |
| 2010/0270983 A1* | 10/2010 | Gong | B60L 3/0046 320/167 |
| 2011/0031811 A1* | 2/2011 | Park | H02J 7/345 307/66 |
| 2011/0208370 A1 | 8/2011 | Lee | |
| 2011/0227540 A1* | 9/2011 | Kanoh | H02J 7/345 320/135 |
| 2012/0039061 A1* | 2/2012 | McBee | H01F 27/06 361/825 |
| 2013/0015701 A1* | 1/2013 | Lee | H02J 7/1446 307/9.1 |
| 2013/0154579 A1 | 6/2013 | Morita et al. | |
| 2013/0221907 A1 | 8/2013 | Suzuki et al. | |
| 2017/0222451 A1 | 8/2017 | Peng | |

FOREIGN PATENT DOCUMENTS

| | | |
|---|---|---|
| CN | 102684267 A | 9/2012 |
| CN | 103166454 A | 6/2013 |
| CN | 104599850 A | 5/2015 |
| JP | 2002359008 A | 12/2002 |
| KR | 20110015273 A | 2/2011 |
| WO | 2012006115 A2 | 1/2012 |

OTHER PUBLICATIONS

Machine Translation and Abstract of Chinese Publication No. CN101214796, Jul. 9, 2008, 17 pages.
Machine Translation and Abstract of Chinese Publication No. CN102684267, Sep. 19, 2012, 6 pages.
Machine Translation and Abstract of Chinese Publication No. CN104599850, May 6, 2015, 38 pages.
Foreign Communication From a Counterpart Application, Chinese Application No. 201410843040.2, Chinese Search Report dated Dec. 22, 2016, 2 pages.
Foreign Communication From a Counterpart Application, Chinese Application No. 201410843040.2, Chinese Office Action dated Jan. 12, 2017, 3 pages.
Foreign Communication From a Counterpart Application, PCT Application No. PCT/CN2015/098115, English Translation of International Search Report dated Mar. 10, 2016, 2 pages.
Foreign Communication From a Counterpart Application, PCT Application No. PCT/CN2015/098115, English Translation of Written Opinion dated Mar. 10, 2016, 6 pages.

* cited by examiner

CHARGING METHOD AND APPARATUS

CROSS-REFERENCE TO RELATED APPLICATIONS

This application is a continuation of International Patent Application No. PCT/CN2015/098115 filed on Dec. 21, 2015, which claims priority to Chinese Patent Application No. 201410843040.2 filed on Dec. 30, 2014. The disclosures of the aforementioned applications are hereby incorporated by reference in their entireties.

TECHNICAL FIELD

The present disclosure relates to the field of electronic technologies, and in particular, to a charging method and apparatus.

BACKGROUND

A supercapacitor provides power failure protection to a storage system in order to enable the storage system to operate reliably, and prevent the storage system from losing data that is being processed due to a power outage. Because the supercapacitor is a sensitive module, a problem about a life of the supercapacitor needs to be considered when the supercapacitor can satisfy supply of power. A temperature of an environment in which the supercapacitor is located and an operating voltage of the supercapacitor are important factors that affect the life of the supercapacitor. FIG. 1 is a relationship curve graph of a life of a supercapacitor, a charging voltage of the supercapacitor, and a temperature. The life of the supercapacitor is reduced by half each time the charging voltage is increased by 0.2 volts (V) when the temperature of the environment in which the supercapacitor is located stays the same. The life of the supercapacitor is also reduced by half each time the temperature is increased by 10° Celsius (C) when the charging voltage of the supercapacitor stays the same.

Because it is difficult to control the temperature of the environment in which the supercapacitor is located, in other approaches, the life of the supercapacitor is ensured by limiting a maximum value of the charging voltage. If the supercapacitor is required to operate for five years in an environment with a temperature of 50° C., it is obtained, according to the schematic diagram of the relationship curve shown in FIG. 1, that the maximum value of the charging voltage of the supercapacitor is 2 V. In other approaches, to satisfy all power supply needs of the storage system during a power failure and satisfy maximum power supply energy that is for power failure protection and that is needed by the storage system when the storage system operates in full load, the supercapacitor is charged according to the maximum value of the charging voltage of the supercapacitor. However, in practice, most storage systems rarely operate in full load. Therefore, power supply energy that is actually needed by the storage system during a power failure is lower than the maximum power supply energy that is for a power failure protection and that is needed by the storage system operating in full load, and a charging voltage that is actually needed by the supercapacitor is also lower than a maximum charging voltage. As shown in the relationship curve graph shown in FIG. 1, the life of the supercapacitor is reduced by half each time the charging voltage is increased by 0.2 V when the temperature of the environment in which the supercapacitor is located stays the same. The life of the supercapacitor is reduced if the supercapacitor is not charged according to the charging voltage that is actually needed by the supercapacitor but keeps being charged according to the maximum charging voltage.

SUMMARY

The present disclosure provides a charging method and apparatus such that a supercapacitor can be charged according to an actual charging voltage of the supercapacitor, thereby prolonging a life of the supercapacitor.

A first aspect of the present disclosure provides a charging method, including obtaining power supply energy needed by a storage system during a power failure, detecting a temperature of an environment in which a supercapacitor is located, to obtain environmental temperature information of the supercapacitor, where the supercapacitor is configured to provide the power supply energy to the storage system, determining a charging voltage of the supercapacitor according to the environmental temperature information and the power supply energy, and charging the supercapacitor according to the determined charging voltage.

With reference to the implementation manner of the first aspect of the present disclosure, in a first possible implementation manner of the first aspect of the present disclosure, obtaining power supply energy needed by a storage system during a power failure includes obtaining first power information of each of modules in the storage system that are operating, obtaining a power failure sequence and power failure duration of each of the modules during the power failure, obtaining, according to the first power information of each of the modules that are operating, power information of the storage system that is obtained after each of the modules have encountered the power failure, and obtaining a power curve according to the power information of the storage system that is obtained after each of the modules have encountered the power failure and the power failure sequence and the power failure duration of each of the modules during the power failure, and performing integration on the power curve falling within the power failure duration of all the modules, to obtain the power supply energy.

With reference to the first possible implementation manner of the first aspect of the present disclosure, in a second possible implementation manner of the first aspect of the present disclosure, obtaining first power information of each of modules in the storage system that are operating includes sampling powers of each of the modules that are operating, to obtain at least one piece of second power information of each of the modules, and selecting, from the at least one piece of second power information of each of the modules, second power information that has a maximum power value as the first power information of each of the modules.

With reference to the first possible implementation manner of the first aspect of the present disclosure, in a third possible implementation manner of the first aspect of the present disclosure, obtaining first power information of each of modules in the storage system that are operating includes obtaining configuration information of each of the modules, and obtaining the first power information of each of the modules from the configuration information of each of the modules.

With reference to the implementation manner of the first aspect of the present disclosure, in a fourth possible implementation manner of the first aspect of the present disclosure, determining a charging voltage of the supercapacitor according to the environmental temperature information and the power supply energy includes determining a capacitance value of the supercapacitor according to the environmental temperature information, and calculating the charging voltage of the supercapacitor according to the capacitance value and the power supply energy.

A second aspect of the present disclosure provides a charging apparatus, including an obtaining module configured to obtain power supply energy needed by a storage system during a power failure, a detection module configured to detect a temperature of an environment in which a supercapacitor is located, to obtain environmental temperature information of the supercapacitor, where the supercapacitor is configured to provide the power supply energy to the storage system, and a determining module configured to determine a charging voltage of the supercapacitor according to the environmental temperature information obtained by the detection module and the power supply energy obtained by the obtaining module, and charge the supercapacitor according to the determined charging voltage.

With reference to the implementation manner of the second aspect of the present disclosure, in a first possible implementation manner of the second aspect of the present disclosure, the obtaining module includes a first obtaining unit configured to obtain first power information of each of modules in the storage system that are operating, a second obtaining unit configured to obtain a power failure sequence and power failure duration of each of the modules during the power failure, a third obtaining unit configured to obtain, according to the first power information, obtained by the first obtaining unit, of each of the modules that are operating, power information of the storage system that is obtained after each of the modules have encountered the power failure, and obtain a power curve according to the power information of the storage system that is obtained after each of the modules have encountered the power failure and the power failure sequence and the power failure duration of each of the modules during the power failure that are obtained by the second obtaining unit, and an integrating unit configured to perform integration on the power curve falling within the power failure duration of all the modules, to obtain the power supply energy.

With reference to the first possible implementation manner of the second aspect of the present disclosure, in a second possible implementation manner of the second aspect of the present disclosure, the first obtaining unit includes a sampling subunit configured to sample powers of each of the modules that are operating, to obtain at least one piece of second power information of each of the modules, and a selection subunit configured to select, second power information that has a maximum power value in the at least one piece of second power information of each of the modules that is obtained by the sampling subunit, as the first power information of each of the modules.

With reference to the first possible implementation manner of the second aspect of the present disclosure, in a third possible implementation manner of the second aspect of the present disclosure, the first obtaining unit includes an obtaining subunit configured to obtain configuration information of each of the modules, and obtain the first power information of each of the modules from the configuration information of each of the modules.

With reference to the implementation manner of the second aspect of the present disclosure, in a fourth possible implementation manner of the second aspect of the present disclosure, the determining module includes a determining unit configured to determine a capacitance value of the supercapacitor according to the environmental temperature information obtained by the detection module, and a calculation unit configured to calculate the charging voltage of the supercapacitor according to the capacitance value determined by the determining unit and the power supply energy calculated by the obtaining module.

By means of the present disclosure, power supply energy needed by a storage system during a power failure is obtained, a temperature of an environment in which a supercapacitor is located is detected, to obtain environmental temperature information of the supercapacitor, where the supercapacitor is configured to provide the power supply energy to the storage system, and a charging voltage of the supercapacitor is determined according to the environmental temperature information and the power supply energy, and the supercapacitor is charged according to the determined charging voltage. An actual charging voltage of the supercapacitor can be determined by obtaining power supply energy that is actually needed by the storage system during the power failure and by obtaining environmental temperature information, and then the supercapacitor can be charged according to the actual charging voltage of the supercapacitor such that a life of the supercapacitor is prolonged.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

By means of the embodiments of the present disclosure, a supercapacitor can be charged according to an actual charging voltage of the supercapacitor such that a life of the supercapacitor is prolonged.

Figure 1:
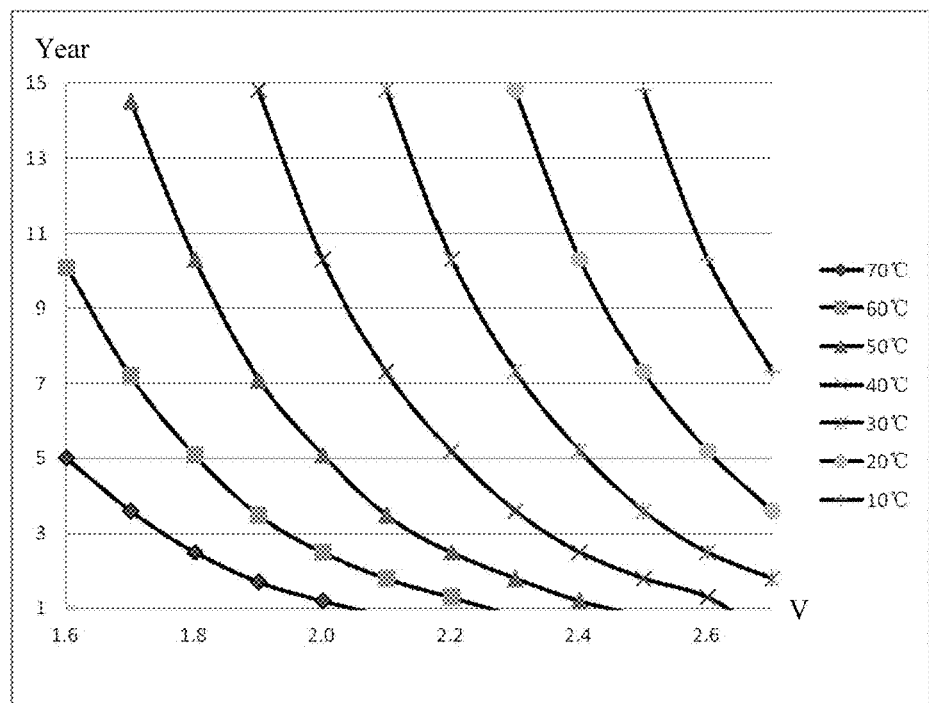
FIG. 1 is a schematic diagram of a relationship curve of a life of a supercapacitor, a charging voltage of the supercapacitor, and a temperature according to an embodiment of the present disclosure.
Figure 2:
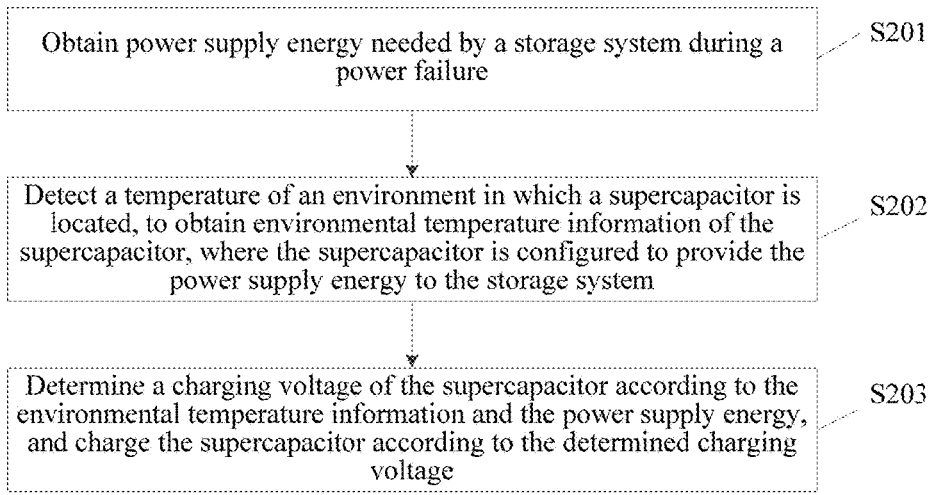
FIG. 2 is a schematic flowchart of a charging method according to a first embodiment of the present disclosure.

Referring to FIG. 2, FIG. 2 is a schematic flowchart of a charging method according to a first embodiment of the present disclosure. For a relationship of a life of a supercapacitor, a charging voltage of the supercapacitor, and a temperature that are involved in this embodiment of the present disclosure, refer to a relationship curve graph shown in FIG. 1. The schematic diagram of the relationship curve may be obtained using a formula:

$$L = 2^{\frac{V_0 - V_1}{0.2}} \times 2^{\frac{T_0 - T_1}{10}} \times L_0,$$

where L is an actual life of a supercapacitor, $L_0$ is a rated life of the supercapacitor, $V_0$ is a rated voltage of the supercapacitor, $V_1$ is an actual operating voltage of the supercapacitor, $T_0$ is a rated maximum temperature of an environment in which the supercapacitor is located, $T_1$ is an actual temperature of the environment in which the supercapacitor is located, 0.2 is a voltage parameter, and 10 is a temperature parameter. It can be known from the schematic diagram of the relationship curve that at a same temperature, the life of the supercapacitor changes as the operating voltage changes. In this embodiment of the present disclosure, power supply energy of a storage system is obtained using a baseboard management controller, an actual operating voltage, that is, a charging voltage, of the supercapacitor, is calculated, and then the charging voltage of the supercapacitor is adjusted.

As shown in FIG. 2, the embodiment of the charging method according to this embodiment of the present disclosure may include the following steps.

Step S201: Obtain power supply energy needed by the storage system during a power failure.

In specific implementation, the power supply energy needed by the storage system during the power failure may be obtained using a baseboard management controller.

In a possible implementation manner, the baseboard management controller may detect in real time a power of a storage system during operation, to obtain at least one piece of power information, then select second power information that has a maximum power value in the obtained at least one piece of power information, and then obtain power failure duration of the storage system in order to obtain maximum power supply energy of the storage system during the power failure. Therefore, the supercapacitor can support the maximum power supply energy that is actually needed by the storage system when the storage system encounters the power failure.

In a possible implementation manner, the baseboard management controller may obtain power information of the storage system from configuration information of the storage system. Further, an actual power of the storage system may be tested before the storage system is put into use, and a testing result is stored in the configuration information. Therefore, the configuration information may be obtained by reading information such as an electronic label on the storage system in order to obtain first power information of the storage system.

In a possible implementation manner, the storage system may include any type of module that needs power failure protection, for example, a module without using backup power (for example, a hard disk and a non-critical chip), an interface card module, a fan module, a coffer disk, and a storage control module (including a central processing unit (CPU), a memory, a communications chip, or the like). Therefore, first power information of each of the modules may be obtained, and power information of the storage system that is obtained after each of the modules have encountered the power failure is obtained according to the first power information of each of the modules. A power failure sequence of the modules and power failure duration of the modules are then obtained. A power curve is obtained according to the power information of the storage system that is obtained after each of the modules have encountered the power failure, the power failure sequence of each of the modules, and the power failure duration of each of the modules. Finally, integration is performed on the power curve falling within the power failure duration of all the modules, to obtain the power supply energy needed by the storage system during the power failure.

Step S202: Detect a temperature of an environment in which the supercapacitor is located, to obtain environmental temperature information of the supercapacitor, where the supercapacitor is configured to provide the power supply energy to the storage system.

In specific implementation, a temperature sensor may be placed around the supercapacitor, and the temperature sensor transfers the environmental temperature information to the baseboard management controller such that the environmental temperature information of the supercapacitor is obtained.

Step S203: Determine a charging voltage of the supercapacitor according to the environmental temperature information and the power supply energy, and charge the supercapacitor according to the determined charging voltage.

In specific implementation, because a capacitance value of the supercapacitor is related to the temperature of the environment in which the supercapacitor is located, the capacitance value of the supercapacitor may be calculated according to the environmental temperature information obtained by the baseboard management controller. The charging voltage of the supercapacitor is eventually calculated according to the capacitance value of the supercapacitor and the obtained power supply energy of each of the modules. After the charging voltage of the supercapacitor is obtained, an output voltage of a supercapacitor charging power supply is adjusted according to the determined charging voltage such that the power supply charges the supercapacitor according to the determined charging voltage.

In a possible implementation manner, the capacitance value of the supercapacitor is further related to an operational life of a device on which the storage system is configured. Therefore, a deviation from a rated capacitance value of the supercapacitor may be further determined according to the environmental temperature information and the operational life of the device in order to obtain the capacitance value of the supercapacitor.

By means of this embodiment of the present disclosure, power supply energy needed by a storage system during a power failure is obtained. A temperature of an environment in which a supercapacitor is located is detected, to obtain environmental temperature information of the supercapacitor, where the supercapacitor is configured to provide the power supply energy to the storage system, and a charging voltage of the supercapacitor is determined according to the environmental temperature information and the power supply energy, and the supercapacitor is charged according to the determined charging voltage. An actual charging voltage of the supercapacitor can be determined by obtaining power supply energy that is actually needed by the storage system during the power failure and by obtaining environmental temperature information, and then the supercapacitor can be charged according to the actual charging voltage of the supercapacitor such that a life of the supercapacitor is prolonged.

Figure 3:
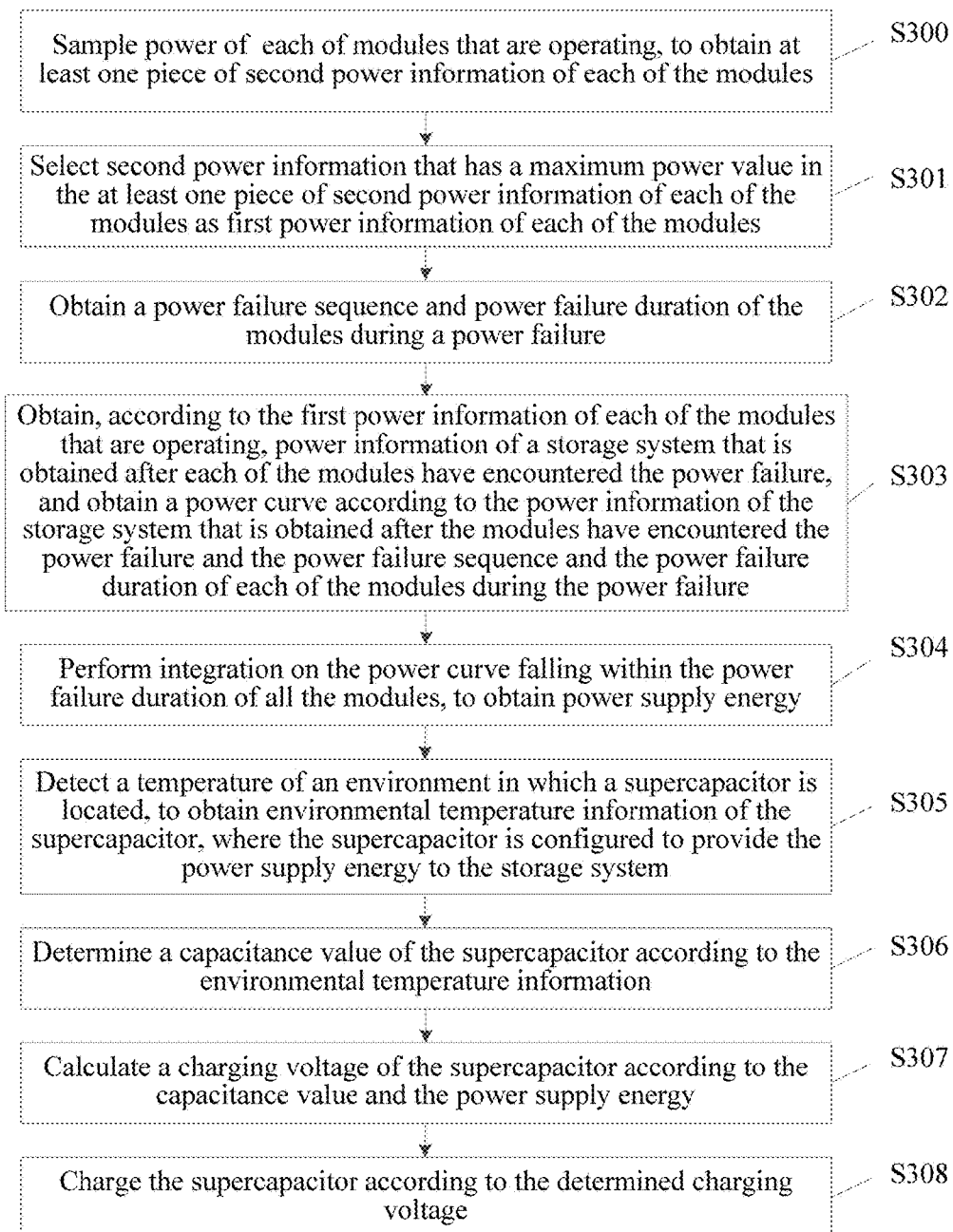
FIG. 3 is a schematic flowchart of a charging method according to a second embodiment of the present disclosure.

Referring to FIG. 3, FIG. 3 is a schematic flowchart of another embodiment of a charging method according to an embodiment of the present disclosure. A storage system involved in this embodiment of the present disclosure may include any type of module that needs power failure protection, for example, a module without using backup power (for example, a hard disk and a non-critical chip), an interface card module, a fan module, a coffer disk, and a storage control module (including a CPU, a memory, a communications chip, or the like). Because different modules have different powers, first power information of each of modules in the storage system that are operating, and a power failure sequence and power failure duration of each of the modules during a power failure may be obtained, and power supply energy needed by all the modules during the power failure (that is, power supply energy of the storage system during the power failure) may be calculated. A detailed description is provided below.

As shown in FIG. 3, another embodiment of the charging method according to this embodiment of the present disclosure may include the following steps.

Step S300: Sample power of each of the modules that are operating, to obtain at least one piece of second power information of each of the modules.

Figure 6:
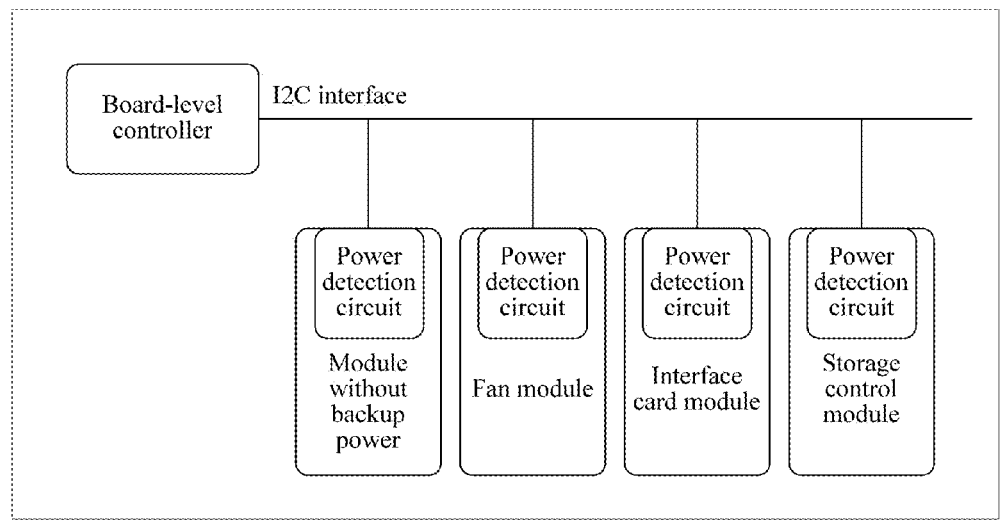
FIG. 6 is a schematic diagram of a connection between a baseboard management controller and modules according to an embodiment of the present disclosure.

In specific implementation, the first power information of each of modules in the storage system that are operating may be obtained, where an obtaining manner may be sampling the powers of each of the modules that are operating, to obtain the at least one piece of second power information of each of the modules. As shown in FIG. 6, sampling may be performed in real time, using an inter-integrated circuit (I2C) interface of a baseboard management controller, on the powers of each of the modules that are operating in order to obtain the at least one piece of second power information of each module. This embodiment is described using an example in which each of the modules are respectively a module without using backup power, a fan module, an interface card module, and a storage control module such as a CPU. Using the fan module as an example, the baseboard management controller may perform sampling in real time on a power of the fan module during operation when the fan module is operating, to obtain at least one piece of second power information of the fan module, and store the at least one piece of second power information in a preset real-time power table.

In a possible implementation manner, as shown in FIG. 6, a power detection circuit may be further disposed on each of the modules that need power failure protection, to detect powers of each of the modules in a current operating scenario, and then the I2C interface of the baseboard management controller reads real-time powers of each of the modules detected by the power detection circuit.

Step S301: Select second power information that has a maximum power value in the at least one piece of second power information of each of the modules as first power information of each of the modules.

In specific implementation, after the at least one piece of second power information of each of the modules included in the storage system is stored in the preset real-time power table, the at least one piece of second power information stored in each of the modules is compared with each other, and the second power information that has a maximum power value in the at least one piece of second power information stored in each of the modules is selected as the first power information. Therefore, when the storage system encounters a power failure, a supercapacitor can support maximum power supply energy that is actually needed by all the modules in the storage system.

Figure 7:
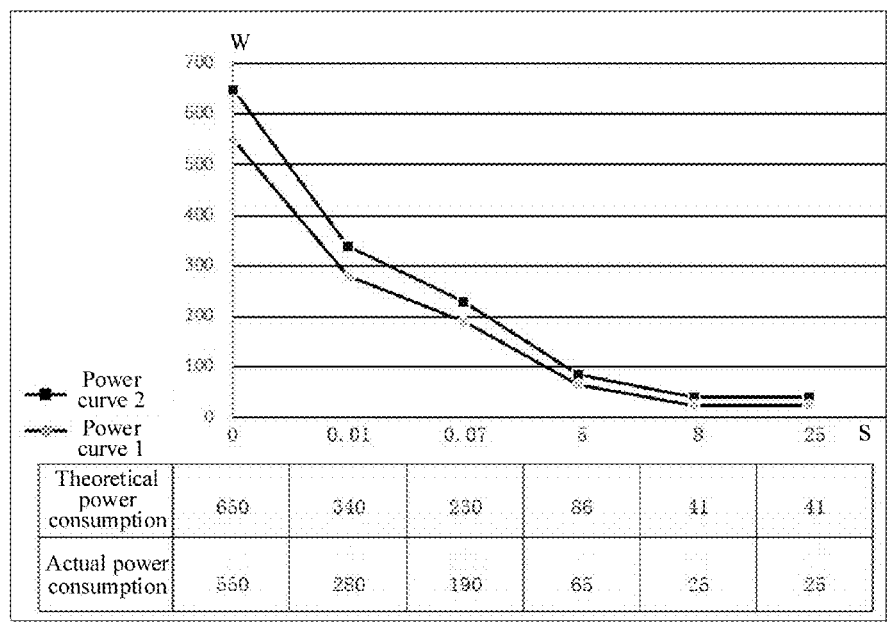
FIG. 7 is a schematic diagram of a power curve according to an embodiment of the present disclosure.

In specific implementation, as shown in FIG. 7, FIG. 7 is a schematic diagram of a power curve according to an embodiment of the present disclosure. In this embodiment of the present disclosure, the first power information of each of the modules obtained by sampling the powers of each of the modules during operation is as follows. A power in the first power information of the module without using backup power is 270 watts, a power in the first power information of the fan module is 90 watts, a power in the first power information of the interface card module is 125 watts, and a power in the first power information of the storage control module is 40 watts.

In a possible implementation manner, in other approaches, power of each of the modules in the storage system are obtained by means of theoretical calculation when each of the modules are operating in full load. Therefore, first power information of each of the modules obtained by means of theoretical calculation is as follows. The power in the first power information of the module without using backup power is 310 watts, the power in the first power information of the fan module is 110 watts, the power in the first power information of the interface card module is 144 watts, and the power in the first power information of the storage control module is 45 watts.

Step S302: Obtain a power failure sequence and power failure duration of the modules during a power failure.

In specific implementation, to calculate power supply energy of each of the modules, the power failure duration of each of the modules needs to be obtained. The power failure duration is a time interval from a time point when a module encounters a power failure to a time point when the module is turned off. For example, as shown in FIG. 7, power failure duration of the module without using backup power is approximately 0.01 second, power failure duration of the fan module is approximately 0.06 second, power failure duration of the interface card module and a power supply of the interface card module is approximately 5 seconds, an underclocking time of the storage control module such as the CPU after the power failure occurs is approximately 3 seconds, and a time from a time point when the CPU transfers data in the memory to the coffer disk to a time point when the CPU has transferred the data is approximately 17 seconds.

In specific implementation, the obtained power failure sequence of each of the modules during the power failure is as follows. Within a time from the $0^{th}$ second to the $0.01^{th}$ second, power consumption of the storage system starts to reduce rapidly, and the module without using backup power starts to be turned off, where mainly hardware modules without power failure protection, for example, a hard disk and a non-critical chip of an external interface, are turned off. Within a time from the $0.01^{th}$ second to the $0.07^{th}$ second, the fan module is turned off, and in this case, the power of the fan module is gradually reduced to 0. Within a time from the $0.07^{th}$ second to the $5^{th}$ second, the interface card module is unloaded, and the power supply of the interface card module is turned off. Within a time from the $5^{th}$ second to the $8^{th}$ second, the storage control module such as the CPU starts to be underclocked, to reduce an overall power of the storage system. Within a time from the $8^{th}$ second to the $25^{th}$ second, the CPU starts to transfer the data from the memory to the coffer disk.

Step S303: Obtain, according to the first power information of each of the modules that are operating, power information of the storage system that is obtained after each of the modules have encountered the power failure, and obtain a power curve according to the power information of the storage system that is obtained after each of the modules have encountered the power failure and the power failure sequence and the power failure duration of each of the modules during the power failure.

In specific implementation, sorting is performed according to the power failure sequence of each of the modules, the power information of the storage system that is obtained after each of the modules have encountered the power failure is obtained according to powers in the first power information of each of the modules that is obtained in step S301, and then the power curve shown in FIG. 7 is obtained according to the power information of the storage system that is obtained after each of the modules have encountered the power failure and the power failure duration of each of the modules.

In specific implementation, a power failure end time of each module corresponds to power information of the storage system that is obtained after each of the modules have encountered the power failure, and finally a power curve 1 of the entire storage system is obtained. Referring to the power curve 1 in FIG. 7, after sampling is performed on the powers of each of the modules that are operating to obtain the powers in the first power information of each of the modules, the power of the storage system after each of the modules have encountered the power failure is as follows. An actual power that is obtained by the baseboard management controller through detection and that is of the storage system before the power failure occurs is 550 watts. The actual power of the storage system is reduced to 280 watts after the module without using backup power (such as the hard disk and the non-critical chip) is turned off. The actual power of the storage system is reduced to 190 watts after the fan module is turned off. The actual power of the storage system is reduced to 65 watts after the external interface such as the interface card module is turned off. The actual power of the storage system is eventually reduced to 25 watts when the storage control module such as the CPU is underclocked and starts to transfer the data from the memory to the coffer disk.

In a possible implementation manner, a power curve 2 that exists when the entire storage system operates in full load may be further obtained according to the power failure end time of each module and powers of the modules operating in full load that are obtained by means of theoretical calculation. Referring to the power curve 2 in FIG. 7, a full-load power that is obtained by means of theoretical calculation and that is of the storage system before the power failure occurs is 650 watts. The power of the storage system is reduced to 340 watts after the module without using backup power (such as the hard disk and the non-critical chip) is turned off. The power of the storage system is reduced to 230 watts after the fan module is turned off. The power of the storage system is reduced to 86 watts after the external interface such as the interface card module is turned off. The power of the storage system is reduced to 41 watts when the storage control module such as the CPU is underclocked and starts to transfer the data from the memory to the coffer disk. Therefore, it may be seen from FIG. 7 that an overall power of the power curve 1 is lower than an overall power of the power curve 2. Actual powers obtained by sampling the powers of each of the modules during operation and that are of each of the modules are all lower than powers obtained by means of calculation and that are of each of the modules operating in full load. An actual power of the storage system is also lower than a power of the system operating in full load after each of the modules has encountered the power failure.

Step S304: Perform integration on the power curve falling within the power failure duration of all the modules, to obtain the power supply energy.

In specific implementation, a total power failure duration of the power curve 1 shown in FIG. 7 is 25 seconds. Therefore, integration is performed on the power curve 1 falling within the 25 seconds, to obtain actual power supply energy of the storage system. The actual power supply energy is power supply energy provided by the supercapacitor.

In a possible implementation manner, integration may also be performed on the power curve 2 falling within the 25 seconds, to obtain theoretical power supply energy of the storage system. Performing integration on a curve falling within a determined range belongs to other approaches, and details are not described in this embodiment of the present disclosure.

Step S305: Detect a temperature of an environment in which a supercapacitor is located, to obtain environmental temperature information of the supercapacitor, where the supercapacitor is configured to provide the power supply energy to the storage system.

In specific implementation, a temperature sensor may be placed around the supercapacitor, and the temperature sensor transfers the environmental temperature information to the baseboard management controller such that the environmental temperature information of the supercapacitor is obtained. Because a capacitance value of the supercapacitor is related to the temperature of the environment in which the supercapacitor is located, a capacitance value of the supercapacitor at a current temperature is calculated according to the environmental temperature information obtained by the baseboard management controller. This embodiment of the present disclosure is described using an example in which the detected temperature of the environment is 60° C.

Step S306: Determine a capacitance value of the supercapacitor according to the environmental temperature information.

In specific implementation, determining the capacitance value of the supercapacitor according to the temperature of the environment in which the supercapacitor is located belongs to the other approaches, and details are not described in this embodiment of the present disclosure.

In a possible implementation manner, the capacitance value of the supercapacitor is further related to an operational life of a device on which the storage system is configured. Therefore, a deviation from a rated capacitance value of the supercapacitor may be further determined according to the environmental temperature information and the operational life of the device (for example, if the rated capacitance value of the selected supercapacitor is 600 Farads (F), it is determined, according to the environmental temperature information and the operational life of the device, that the deviation from the rated capacitance value may be ±20%) in order to obtain that the capacitance value of the supercapacitor does not exceed the rated capacitance value by ±20%.

Step S307: Calculate a charging voltage of the supercapacitor according to the capacitance value and the power supply energy.

In specific implementation, it is assumed that the actual power supply energy obtained by performing integration on the power curve 1 is 797 joules, and the theoretical power supply energy obtained by performing integration on the power curve 2 is 1124 joules. If six supercapacitors are connected in series to provide power failure protection to the storage system, a charging voltage of each supercapacitor may be calculated using a formula:

$$Q = \frac{1}{2} \cdot C \cdot V^2,$$

where the capacitance value C is equal to a ratio of a capacitance value of the supercapacitor to n when the temperature of the environment is 60° C. and n is a quantity of supercapacitors connected in series, and V is equal to a product of multiplying the charging voltage of the supercapacitor by n. The calculation process belongs to the other approaches, and details are not described in this embodiment of the present disclosure.

Figure 8:
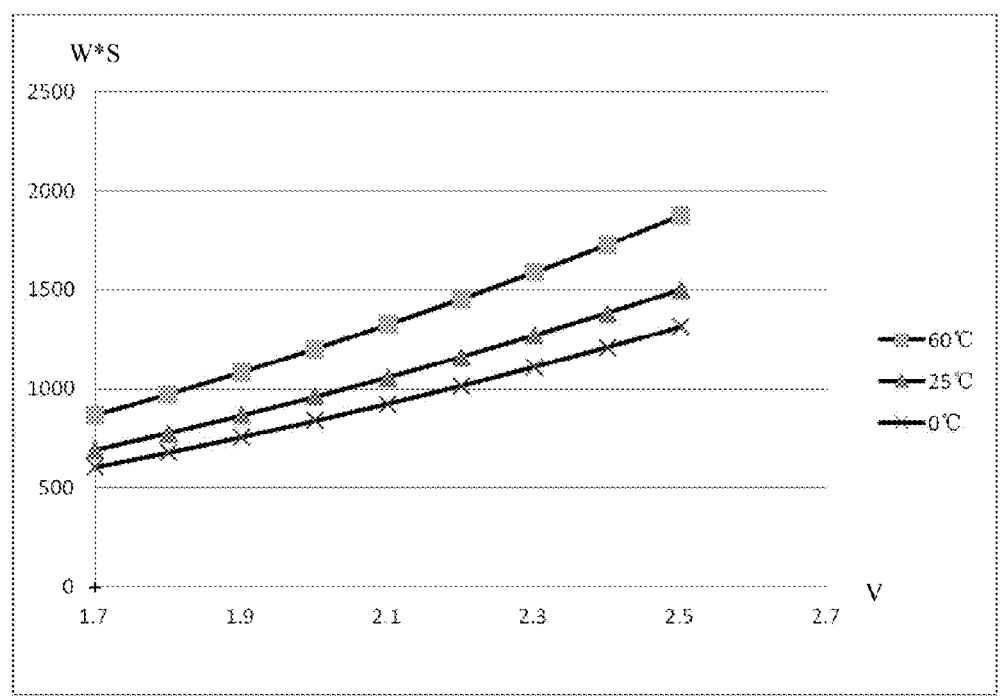
FIG. 8 is a schematic diagram of a curve of a charging voltage of a supercapacitor and power supply energy according to an embodiment of the present disclosure.

In specific implementation, as shown in FIG. 8, FIG. 8 is a schematic diagram of a curve of a charging voltage of a supercapacitor and power supply energy. A curve shown in FIG. 8 is a schematic diagram of a curve of the formula $$Q = \frac{1}{2} \cdot C \cdot V^2.$$

The charging voltage of the supercapacitor may be intuitively obtained using the schematic diagram of a curve in FIG. 8. It may be obtained from the schematic diagram of a curve that when the temperature of the environment in which the supercapacitor is located is 60° C., an actual charging voltage of the supercapacitor is 1.7 V if power supply energy (that is, actual power supply energy) is 797 joules, or a theoretical charging voltage of the supercapacitor is 1.9 V if power supply energy (that is, theoretical power supply energy) is 1124 joules. In this case, the actual charging voltage and the theoretical charging voltage of the supercapacitor are compared according to the relationship curve graph shown in FIG. 1, and it is obtained that the life of the supercapacitor is 7 years when the charging voltage is 1.7 V, and the life of the supercapacitor is only 3.5 years when the charging voltage is 1.9 V. Therefore, the life of the supercapacitor is doubled if the supercapacitor is charged according to the actual charging voltage.

Step S308: Charge the supercapacitor according to the determined charging voltage.

In specific implementation, the supercapacitor is charged according to an actual charging voltage such that the supercapacitor provides actual power supply energy to all the modules of the storage system according to the actual charging voltage when the storage system encounters the power failure.

Figure 9:
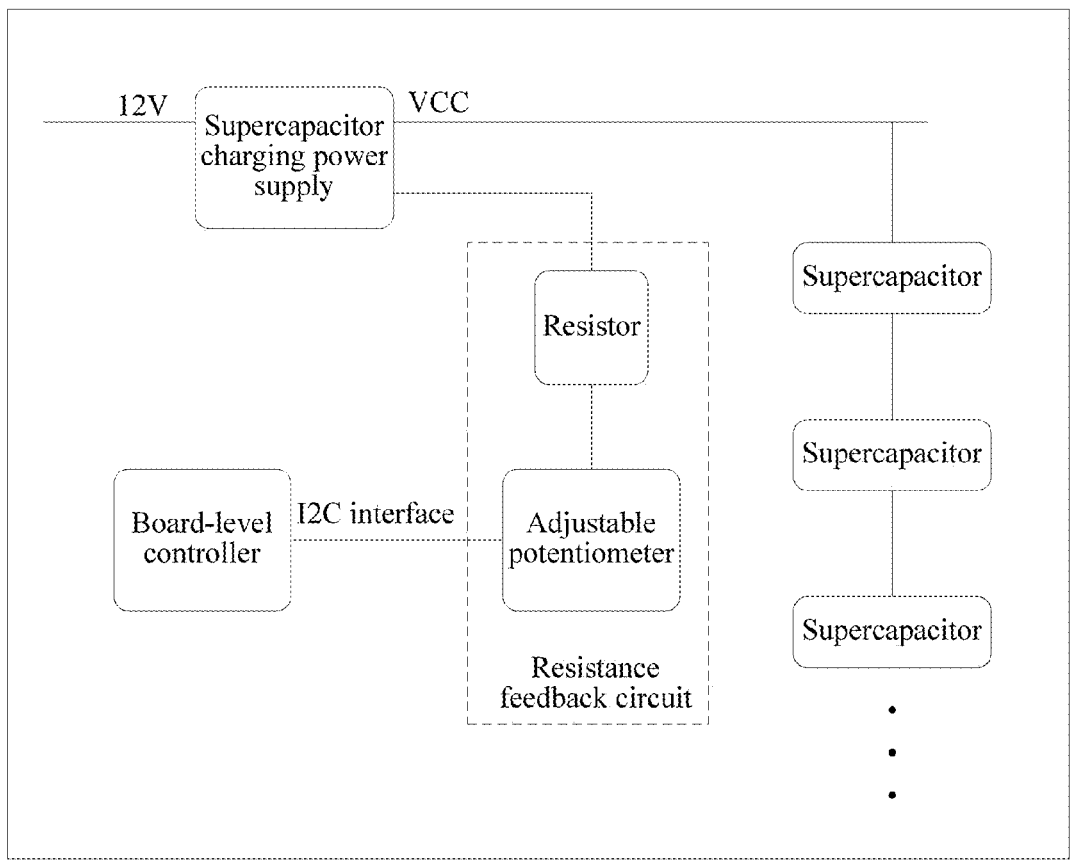
FIG. 9 is a schematic diagram of a circuit structure for adjusting a charging voltage of a supercapacitor according to an embodiment of the present disclosure.

In a possible implementation manner, as shown in a diagram of a circuit structure shown in FIG. 9, an output voltage of a supercapacitor charging power supply may be adjusted using a resistance feedback circuit after charging voltages of supercapacitors are determined, and then the charging voltage is allocated to each supercapacitor according to the output voltage of the supercapacitor charging power supply, making a charging voltage of each supercapacitor be the charging voltage obtained by means of calculation in step S307. The resistance feedback circuit includes a resistor and an adjustable potentiometer. The supercapacitor charging power supply is an apparatus that can convert electric energy of a main power supply into electric energy of another form or specification in order to meet requirements of different electrical devices, and change an output voltage as needed.

By means of this embodiment of the present disclosure, sampling is performed on powers that occur when each of modules are operating, to obtain at least one piece of second power information of each of the modules, second power information that has a maximum power value in the at least one piece of second power information of each of the modules is selected as first power information of each of the modules, a power failure sequence and power failure duration of each of the modules during the power failure are obtained, power information of a storage system that occurs after each of the modules have encountered the power failure is obtained according to the first power information of each of the modules that are operating, and a power curve is obtained according to the power information of the storage system obtained after each of the modules have encountered the power failure and the power failure sequence and the power failure duration of each of the modules during the power failure. Integration is performed on the power curve falling within the power failure duration of all the modules, to obtain actual power supply energy of the storage system, and finally a charging voltage of a supercapacitor is determined according to the power supply energy and a detected temperature of an environment in which the supercapacitor is located, and the supercapacitor is charged according to the determined charging voltage such that a life of the supercapacitor is prolonged.

Figure 4:
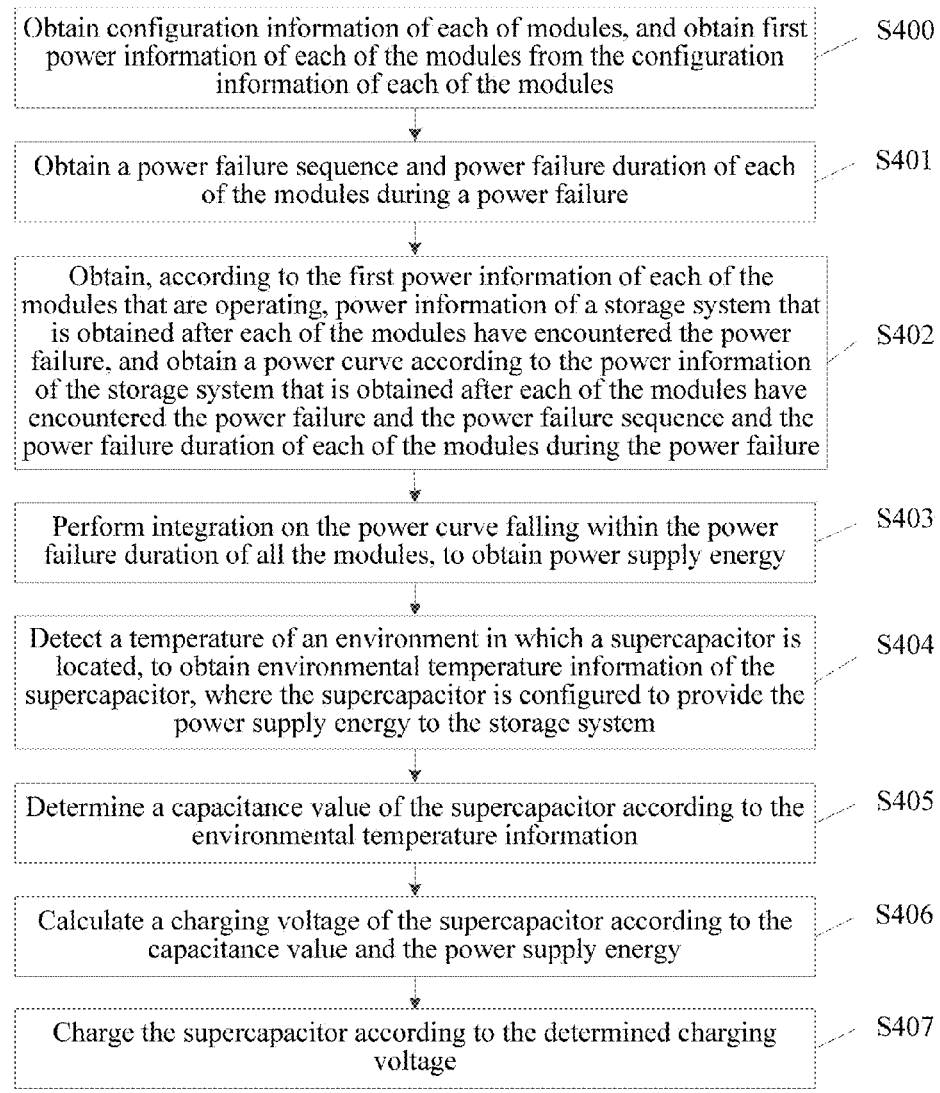
FIG. 4 is a schematic flowchart of a charging method according to a third embodiment of the present disclosure.

Referring to FIG. 4, FIG. 4 is a schematic flowchart of a third embodiment of a charging method according to an embodiment of the present disclosure. A storage system involved in this embodiment of the present disclosure may include any type of module that needs power failure protection, for example, a module without using backup power such as a hard disk and a non-critical chip, an interface card module, a fan module, a coffer disk, and a storage control module (including a CPU, a memory, a communications chip, or the like). In this embodiment of the present disclosure, first power information may be obtained by directly obtaining configuration information of the storage system. Then a power curve is obtained according to the first power information of each of the modules and power failure duration of the each of the modules. Further, power supply energy of all the modules is calculated, and finally, a charging voltage of a supercapacitor is obtained. A detailed description is provided below.

As shown in FIG. 4, the third embodiment of the charging method according to this embodiment of the present disclosure may include the following steps.

Step S400: Obtain configuration information of each of the modules, and obtain first power information of each of the modules from the configuration information of each of the modules.

In specific implementation, the first power information of each of modules in the storage system that are operating may be obtained, where an obtaining manner may be obtaining the configuration information of each of the modules, and obtaining first power information of each of the modules from the configuration information of each of the modules. Further, actual powers of each of the modules may be tested before the storage system is put into use, and a testing result is stored in the configuration information. Units such as CPUs, memories, and communications chips that are configured on storage control modules of different storage systems are different. For example, at least one type of unit of a CPU, a memory, a communications chip or a storage unit may be flexibly configured on a storage control module. Therefore, in this case, real-time powers of the storage control module having different configurations may be detected before the storage control module is put into use, that is, real-time powers of the storage control module on which different CPUs, different memories or different storage units are configured are detected, and first power information of units is generated, and finally, the first power information of the units is stored in configuration information. Optionally, a sum of detected powers of units on the storage control module may also be used as first power information of the storage control module, and the first power information is stored in configuration information.

In a possible implementation manner, powers of the module without using backup power, the fan module, the coffer disk, and another module may be further detected, first power information of each of the modules is similarly generated, and the first power information of each of the modules is stored in configuration information. When the first power information of each of the modules needs to be obtained, the configuration information may be obtained by reading information such as an electronic label on the storage system in order to obtain the first power information of each of the modules. As shown in FIG. 7, FIG. 7 is a schematic diagram of a power curve according to an embodiment of the present disclosure. In this embodiment of the present disclosure, the first power information of each of the modules that is obtained by obtaining the configuration information of each of the modules is as follows. A power in the first power information of the module without using backup power is 270 watts, a power in the first power information of the fan module is 90 watts, a power in the first power information of the interface card module is 125 watts, and a power in the first power information of the storage control module is 40 watts.

In a possible implementation manner, in other approaches, powers of each of the modules in the storage system are obtained by means of theoretical calculation when each of the modules are operating in full load. Therefore, first power information of each of the modules that is obtained by means of theoretical calculation is as follows. The power in the first power information of the module without using backup power is 310 watts, the power in the first power information of the fan module is 110 watts, the power in the first power information of the interface card module is 144 watts, and the power in the first power information of the storage control module is 45 watts.

Step S401: Obtain a power failure sequence and power failure duration of each of the modules during a power failure.

In specific implementation, to calculate power supply energy of each of the modules, the power failure duration of each of the modules needs to be obtained. The power failure duration is a time interval from a time point when a module encounters a power failure to a time point when the module is turned off. For example, as shown in FIG. 7, power failure duration of the module without using backup power is approximately 0.01 second, power failure duration of the fan module is approximately 0.06 second, power failure duration of the interface card module and a power supply of the interface card module is approximately 5 seconds, an underclocking time of the CPU after the power failure occurs is approximately 3 seconds, and a time from a time point when the CPU transfers data in the memory to the coffer disk to a time point when the CPU has transferred the data is approximately 17 seconds.

The obtained power failure sequence of each of the modules during the power failure is as follows. Within a time from the $0^{th}$ second to the $0.01^{th}$ second, system power consumption of the storage system starts to reduce rapidly, where a main method of reducing the power consumption is turning off a hardware module without power failure protection, for example, a hard disk and a non-critical chip. Within a time from the $0.01^{th}$ second to the $0.07^{th}$ second, the fan module is turned off, and in this case, the power of the fan module is gradually reduced to 0. Within a time from the $0.07^{th}$ second to the $5^{th}$ second, the interface card module is unloaded, and the power supply of the interface card module is turned off. Within a time from the $5^{th}$ second to the $8^{th}$ second, the CPU starts to be underclocked, to reduce an overall power of the storage system. Within a time from the $8^{th}$ second to the $25^{th}$ second, the CPU transfers the data from the memory to the coffer disk. Therefore, a power failure end time of each module corresponds to an actual power of the storage system that occurs after each of the modules have encountered the power failure, and finally a power curve 1 of the entire storage system is obtained.

Step S402: Obtain, according to the first power information of each of the modules that are operating, power information of the storage system that is obtained after each of the modules have encountered the power failure, and obtain a power curve according to the power information of the storage system that is obtained after each of the modules have encountered the power failure and the power failure sequence and the power failure duration of each of the modules during the power failure.

In specific implementation, sorting is performed according to the power failure sequence of each of the modules, the power information of the storage system that is obtained after each of the modules have encountered the power failure is obtained according to powers in the first power information of each of the modules that is obtained in step S400, and then the power curve shown in FIG. 7 is obtained according to the power information of the storage system that is obtained after each of the modules have encountered the power failure and the power failure duration of each of the modules.

In specific implementation, the power failure end time of each module corresponds to the power information of the storage system that is obtained after each of the modules have encountered the power failure, and finally the power curve 1 of the entire storage system is obtained. Referring to the power curve 1 in FIG. 7, after the powers in the first power information of each of the modules are obtained by obtaining the configuration information of each of the modules, the power of the storage system after each of the modules have encountered the power failure is as follows.

An actual power that is obtained by obtaining configuration information of the storage system and that is of the storage system before the power failure occurs is 550 watts. The actual power of the storage system is reduced to 280 watts after the module without using backup power (such as the hard disk and the non-critical chip) is turned off. The actual power of the storage system is reduced to 190 watts after the fan module is turned off. The actual power of the storage system is reduced to 65 watts after the external interface such as the interface card module is turned off. The actual power of the storage system is eventually reduced to 25 watts when the storage control module such as the CPU is underclocked and starts to transfer the data from the memory to the coffer disk.

In a possible implementation manner, a power curve 2 that exists when the entire storage system operates in full load may be further obtained according to the power failure end time of each module and powers of each of the modules operating in full load that are obtained by means of theoretical calculation. Referring to the power curve 2 in FIG. 7, a full-load power that is obtained by means of theoretical calculation and that is of the storage system before the power failure occurs is 650 watts. The power of the storage system is reduced to 340 watts after the module without using backup power (such as the hard disk and the non-critical chip) is turned off. The power of the storage system is reduced to 230 watts after the fan module is turned off. The power of the storage system is reduced to 86 watts after the external interface such as the interface card module is turned off. The power of the storage system is reduced to 41 watts when the storage control module such as the CPU is underclocked and starts to transfer the data from the memory to the coffer disk. Therefore, it may be seen from FIG. 7 that an overall power of the power curve 1 is lower than an overall power of the power curve 2. Actual powers that are obtained by obtaining the configuration information of each of the modules and that are of the modules are all lower than powers that are obtained by means of calculation and that are of the modules operating in full load. After the modules have encountered the power failure, an actual power of the storage system is also lower than a power of the system operating in full load.

Step S403: Perform integration on the power curve falling within the power failure duration of all the modules, to obtain the power supply energy.

In specific implementation, a total power failure duration of the power curve 1 shown in FIG. 7 is 25 seconds. Therefore, integration is performed on the power curve 1 falling within the 25 seconds, to obtain actual power supply energy of the storage system. The actual power supply energy is power supply energy provided by the supercapacitor.

In a possible implementation manner, integration may also be performed on the power curve 2 falling within the 25 seconds, to obtain theoretical power supply energy of the storage system. Performing integration on a curve falling within a determined range belongs to other approaches, and details are not described in this embodiment of the present disclosure.

Step S404: Detect a temperature of an environment in which the supercapacitor is located, to obtain environmental temperature information of the supercapacitor, where the supercapacitor is configured to provide the power supply energy to the storage system.

In specific implementation, the temperature of the environment in which the supercapacitor is located may be detected by a baseboard management controller using an environmental temperature sensor in order to obtain the environmental temperature information of the supercapacitor. Because a capacitance value of the supercapacitor is related to the temperature of the environment in which the supercapacitor is located, a capacitance value of the supercapacitor at a current temperature is calculated according to the environmental temperature information obtained by the baseboard management controller. This embodiment of the present disclosure is described using an example in which the detected temperature of the environment is 60° C.

Step S405: Determine a capacitance value of the supercapacitor according to the environmental temperature information.

In specific implementation, determining the capacitance value of the supercapacitor according to the temperature of the environment in which the supercapacitor is located belongs to other approaches, and details are not described in this embodiment of the present disclosure.

In a possible implementation manner, the capacitance value of the supercapacitor is further related to an operational life of a device on which the storage system is configured. Therefore, a deviation from a rated capacitance value of the supercapacitor may be further determined according to the environmental temperature information and the operational life of the device (for example, if the rated capacitance value of the selected supercapacitor is 600 F, it is determined, according to the environmental temperature information and the operational life of the device, that the deviation from the rated capacitance value may be ±20%) in order to obtain that the capacitance value of the supercapacitor does not exceed the rated capacitance value by ±20%.

Step S406: Calculate a charging voltage of the supercapacitor according to the capacitance value and the power supply energy.

In specific implementation, it is assumed that the actual power supply energy obtained by performing integration on the power curve 1 is 797 joules, and the theoretical power supply energy obtained by performing integration on the power curve 2 is 1124 joules. If six supercapacitors are connected in series to provide power failure protection to the storage system, a charging voltage of each supercapacitor may be calculated using a formula:

$$Q = \frac{1}{2} \cdot C \cdot V^2,$$

where the capacitance value C is equal to a ratio of a capacitance value of the supercapacitor to n when the temperature of the environment is 60° C. and n is a quantity of supercapacitors connected in series, and V is equal to a product of multiplying the charging voltage of the supercapacitor by n. The calculation process belongs to the other approaches, and details are not described in this embodiment of the present disclosure.

In specific implementation, as shown in FIG. 8, FIG. 8 is a schematic diagram of a curve of a charging voltage of a supercapacitor and power supply energy. A curve shown in FIG. 8 is a schematic diagram of a curve of the formula $$Q = \frac{1}{2} \cdot C \cdot V^2.$$

The charging voltage of the supercapacitor may be intuitively obtained using the schematic diagram of a curve in FIG. 8. It may be obtained from the schematic diagram of a curve that when the temperature of the environment in which the supercapacitor is located is 60° C., an actual charging voltage of the supercapacitor is 1.7 V if power supply energy (that is, actual power supply energy) is 797 joules, or a theoretical charging voltage of the supercapacitor is 1.9 V if power supply energy (that is, theoretical power supply energy) is 1124 joules. In this case, the actual charging voltage and the theoretical charging voltage of the supercapacitor are compared according to the relationship curve graph shown in FIG. 1, and it is obtained that the life of the supercapacitor is 7 years when the charging voltage is 1.7 V, and the life of the supercapacitor is only 3.5 years when the charging voltage is 1.9 V. Therefore, the life of the supercapacitor is doubled if the supercapacitor is charged according to the actual charging voltage.

Step S407: Charge the supercapacitor according to the determined charging voltage.

In specific implementation, the supercapacitor is charged according to an actual charging voltage charge such that the supercapacitor provides actual power supply energy to all the modules of the storage system according to the actual charging voltage when the storage system encounters the power failure.

In a possible implementation manner, as shown in a diagram of a circuit structure in FIG. 9, after charging voltages of supercapacitors are determined, an output voltage of a supercapacitor charging power supply may be adjusted using a resistance feedback circuit, and then the charging voltage is allocated to each supercapacitor according to the output voltage of the supercapacitor charging power supply, making a charging voltage of each supercapacitor be the charging voltage obtained by means of calculation in step S406. The resistance feedback circuit includes a resistor and an adjustable potentiometer. The supercapacitor charging power supply is an apparatus that can convert electric energy of a main power supply into electric energy of another form or specification in order to meet requirements of different electrical devices, and change an output voltage as needed.

By means of this embodiment of the present disclosure, configuration information of each of modules is obtained, and the first power information of each of the modules is obtained from the configuration information, a power failure sequence and power failure duration of each of the modules during a power failure are obtained, power information of a storage system that occurs after each of the modules have encountered the power failure is obtained according to the first power information of each of the modules that are operating, and a power curve is obtained according to the power information of the storage system that is obtained after each of the modules have encountered the power failure and the power failure sequence and the power failure duration of each of the modules during the power failure, then integration is performed on the power curve falling within the power failure duration of all the modules, to obtain power supply energy of all the modules, and finally a charging voltage of a supercapacitor is determined according to the power supply energy and a detected temperature of an environment in which the supercapacitor is located, and the supercapacitor is charged according to the determined charging voltage such that a life of the supercapacitor is prolonged.

Figure 5:
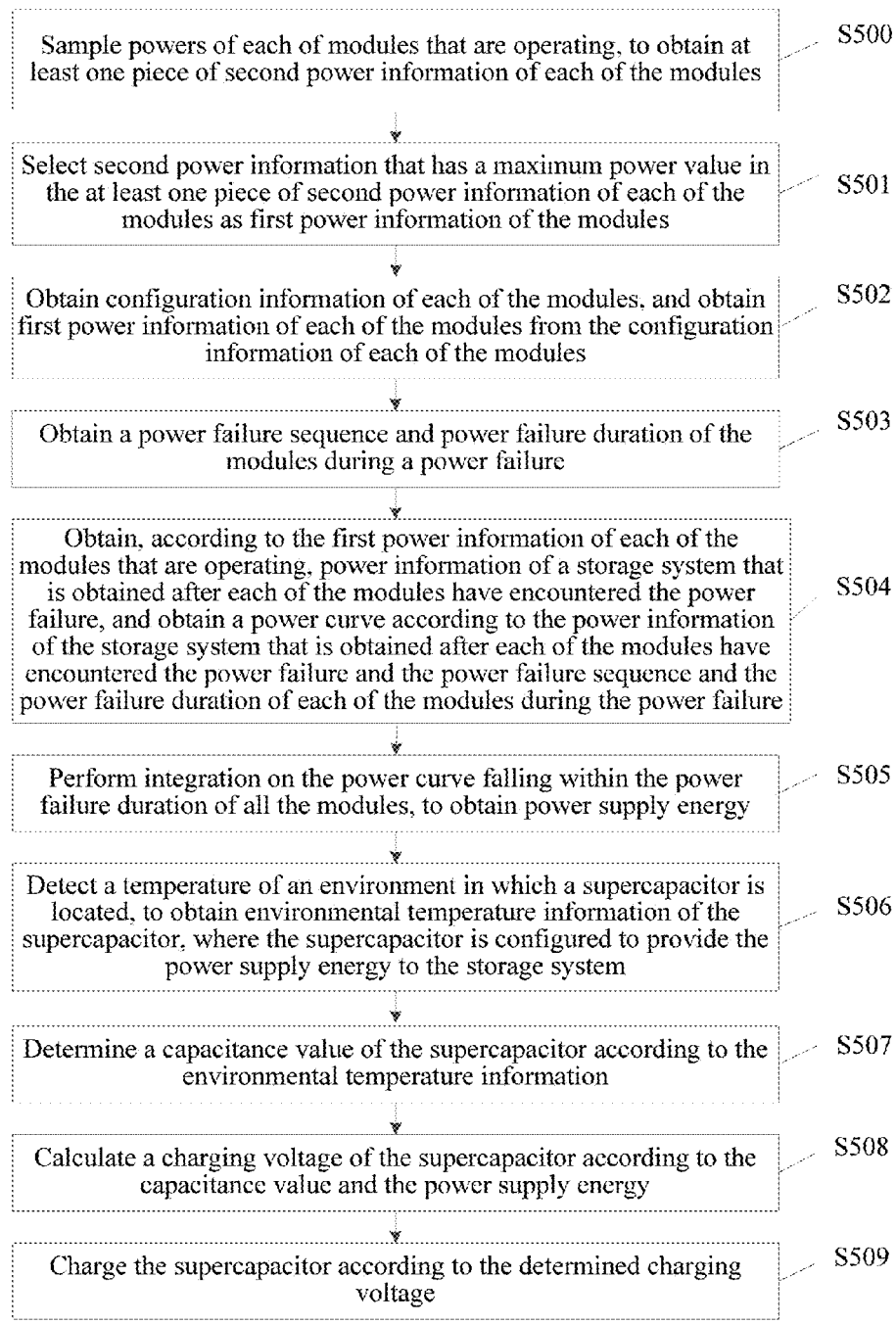
FIG. 5 is a schematic flowchart of a charging method according to a fourth embodiment of the present disclosure.

Referring to FIG. 5, FIG. 5 is a schematic flowchart of a fourth embodiment of a charging method according to an embodiment of the present disclosure. A storage system involved in this embodiment of the present disclosure may include any type of module that needs power failure protection, for example, a module without using backup power such as, a hard disk and a non-critical chip, an interface card module, a fan module, a coffer disk, and a storage control module (including a CPU, a memory, a communications chip, or the like). This embodiment is described with reference to the embodiment in FIG. 3 and the embodiment in FIG. 4. Powers of each of the modules that are operating may be detected in real time, at least one piece of power information is obtained, and then second power information that has a maximum power value in the at least one piece of power information is selected as first power information. Alternatively, power information of each of the modules may be obtained from configuration information of each of the modules.

Step S500: Sample powers of each of the modules that are operating, to obtain at least one piece of second power information of each of the modules.

In specific implementation, for each of modules that have unstable powers within an operating period or each of modules that have relatively great impact on a power failure in a power failure process, sampling may be performed in real time, using an I2C interface of a baseboard management controller, on the powers of each of the modules that are operating in order to obtain the at least one piece of second power information of each module. Because a configuration and an internal structure of the storage control module are relatively complex (where units such as CPUs, memories, and communications chips that are configured on storage control modules of different storage systems are different), in this embodiment, at least one piece of second power information of the storage control module may be obtained, and the at least one piece of second power information of the storage control module may be stored in a preset real-time power table.

In a possible implementation manner, as shown in FIG. 6, a power detection circuit may be further disposed on the storage control module, to detect a power of the storage control module in a current operating scenario, and then the I2C interface of the baseboard management controller reads the power of the storage control module that is detected by the power detection circuit.

Step S501: Select second power information that has a maximum power value in the at least one piece of second power information of each of the modules as first power information of each of the modules.

In specific implementation, after the at least one piece of second power information of the storage control module is stored in the preset real-time power table, the at least one piece of second power information stored in the storage control module is compared with each other, and second power information that has a maximum power value in the at least one piece of second power information of the storage control module is selected as first power information of the storage system. Therefore, when the storage control module encounters a power failure, a supercapacitor can support maximum power supply energy that is actually needed by the module.

Step S502: Obtain configuration information of each of the modules, and obtain the first power information of each of the modules from the configuration information of each of the modules.

In specific implementation, for modules whose powers are relatively stable within an operating period or modules that have a relatively little impact on a power failure in a power failure process, for example, modules such as the module without using backup power, the fan module, and the interface card module, actual powers of the modules may be tested before the modules are put into use, and a testing result is stored in configuration information. Further, powers of the module without using backup power, the fan module, and the interface card module may be separately detected before the module without using backup power, the fan module, and the interface card module are put into use, to generate first power information of the foregoing modules, and the first power information of the foregoing modules is stored in configuration information. The configuration information may be obtained by reading information such as electronic labels on the foregoing modules in order to obtain the first power information of the foregoing modules when the first power information of the foregoing modules needs to be obtained.

In a possible implementation manner, a sequence in which step S500 and step S502 are performed is not limited in this embodiment.

In a possible implementation manner, as shown in FIG. 7, FIG. 7 is a schematic diagram of a power curve according to an embodiment of the present disclosure. In other approaches, powers of the modules are obtained by means of theoretical calculation when the modules are operating in full load. Therefore, first power information of each of the modules that is obtained by means of theoretical calculation is as follows. A power in the first power information of the module without using backup power is 310 watts, a power in the first power information of the fan module is 110 watts, a power in the first power information of the interface card module is 144 watts, and a power in the first power information of the storage control module is 45 watts.

However, a power in the first power information that is obtained by obtaining configuration information of the module without using backup power is 270 watts, a power in the first power information that is obtained by obtaining configuration information of the fan module is 90 watts, a power in the first power information that is obtained by obtaining configuration information of the interface card module is 125 watts, and a power in the first power information that is obtained by performing sampling in real time using the baseboard management controller and that is of the storage control module is 40 watts. Therefore, powers that are obtained by performing sampling in real time by the baseboard management controller and that are of the modules or actual powers that are obtained by obtaining the configuration information of the modules and that are of the modules are all lower than powers that are obtained by means of calculation and that are of the modules operating in full load.

Step S503: Obtain a power failure sequence and power failure duration of each of the modules during a power failure.

In specific implementation, to obtain power supply energy of each of the modules, the power failure duration of each of the modules needs to be obtained. The power failure duration is a time interval from a time point when a module encounters a power failure to a time point when the module is turned off. For example, as shown in FIG. 7, power failure duration of the storage system is approximately 0.01 second, power failure duration of the fan module is approximately 0.06 second, power failure duration of the interface card module and a power supply of the interface card module is approximately 5 seconds, an underclocking time of the CPU after the power failure occurs is approximately 3 seconds, and a time from a time point when the CPU transfers data in the memory to the coffer disk to a time point when the CPU has transferred the data is approximately 17 seconds.

The obtained power failure sequence of each of the modules during the power failure is as follows. Within a time from the $0^{th}$ second to the $0.01^{th}$ second, system power consumption of the storage system starts to reduce rapidly, where a main method of reducing the power consumption is turning off a hardware module without power failure protection, for example, a hard disk and a non-critical chip. Within a time from the $0.01^{th}$ second to the $0.07^{th}$ second, the fan module is turned off, and in this case, the power of the fan module is gradually reduced to 0. Within a time from the $0.07^{th}$ second to the $5^{th}$ second, the interface card module is unloaded, and the power supply of the interface card module is turned off. Within a time from the $5^{th}$ second to the $8^{th}$ second, the CPU starts to be underclocked, to reduce an overall power of the storage system. Within a time from the $8^{th}$ second to the $25^{th}$ second, the CPU transfers the data from the memory to the coffer disk. Therefore, a power failure end time of each module corresponds to an actual power in the first power information of each of the modules, and finally a power curve 1 of the entire storage system is obtained.

Step S504: Obtain, according to the first power information of each of the modules that are operating, power information of the storage system that is obtained after each of the modules have encountered the power failure, and obtain a power curve according to the power information of the storage system that is obtained after each of the modules have encountered the power failure and the power failure sequence and the power failure duration of each of the modules during the power failure.

In specific implementation, sorting is performed according to the power failure sequence of each of the modules, the power information of the storage system that is obtained after each of the modules have encountered the power failure is obtained according to powers in the first power information of each of the modules that is obtained in step S502, and then the power curve shown in FIG. 7 is obtained according to the power information of the storage system that is obtained after each of the modules have encountered the power failure and the power failure duration of each of the modules.

In specific implementation, a power failure end time of each module corresponds to power information of the storage system that is obtained after each of the modules have encountered the power failure, and finally the power curve 1 of the entire storage system is obtained. Referring to the power curve 1 in FIG. 7, after the powers in the first power information of each of the modules are obtained, the power of the storage system after each of the modules have encountered the power failure is as follows. An actual power that is detected by the baseboard management controller or obtained by obtaining configuration information of the storage system and that is of the storage system before the power failure occurs is 550 watts. The actual power of the storage system is reduced to 280 watts after the module without using backup power (such as the hard disk and the non-critical chip) is turned off. The actual power of the storage system is reduced to 190 watts after the fan module is turned off. The actual power of the storage system is reduced to 65 watts after the external interface such as the interface card module is turned off. The actual power of the storage system is eventually reduced to 25 watts when the storage control module such as the CPU is underclocked and starts to transfer the data from the memory to the coffer disk.

In a possible implementation manner, a power curve 2 that exists when the entire storage system operates in full load may be further obtained according to the power failure end time of each module and powers of the modules operating in full load that are obtained by means of theoretical calculation. Referring to the power curve 2 in FIG. 7, a full-load power that is obtained by means of theoretical calculation and that is of the storage system before the power failure occurs is 650 watts. The power of the storage system is reduced to 340 watts after the module without using backup power (such as the hard disk and the non-critical chip) is turned off. The power of the storage system is reduced to 230 watts after the fan module is turned off. The power of the storage system is reduced to 86 watts after the external interface such as the interface card module is turned off. The power of the storage system is reduced to 41 watts when the storage control module such as the CPU is underclocked and starts to transfer the data from the memory to the coffer disk. Therefore, it may be seen from FIG. 7 that an overall power of the power curve 1 is lower than an overall power of the power curve 2. Actual powers that are detected by the baseboard management controller or obtained by obtaining the configuration information of each of the modules are all lower than powers that are obtained by means of calculation and that are of the modules operating in full load. After the modules have encountered the power failure, an actual power of the storage system is also lower than a power of the system operating in full load.

Step S505: Perform integration on the power curve falling within the power failure duration of all the modules, to obtain the power supply energy.

In specific implementation, a total power failure duration of the power curve 1 shown in FIG. 7 is 25 seconds. Therefore, integration is performed on the power curve 1 falling within the 25 seconds, to obtain actual power supply energy of the storage system. The actual power supply energy is power supply energy provided by the supercapacitor.

In a possible implementation manner, integration may also be performed on the power curve 2 falling within the 25 seconds, to obtain theoretical power supply energy of the storage system. Performing integration on a curve falling within a determined range belongs to other approaches, and details are not described in this embodiment of the present disclosure.

Step S506: Detect a temperature of an environment in which a supercapacitor is located, to obtain environmental temperature information of the supercapacitor, where the supercapacitor is configured to provide the power supply energy to the storage system.

In specific implementation, a temperature sensor may be placed around the supercapacitor, and the temperature sensor transfers the environmental temperature information to the baseboard management controller such that the environmental temperature information of the supercapacitor is obtained. Because a capacitance value of the supercapacitor is related to the temperature of the environment in which the supercapacitor is located, a capacitance value of the supercapacitor at a current temperature is calculated according to the environmental temperature information obtained by the baseboard management controller. This embodiment of the present disclosure is described using an example in which the detected temperature of the environment is 60° C.

Step S507: Determine a capacitance value of the supercapacitor according to the environmental temperature information.

In specific implementation, determining the capacitance value of the supercapacitor according to the temperature of the environment in which the supercapacitor is located belongs to other approaches, and details are not described in this embodiment of the present disclosure.

In a possible implementation manner, the capacitance value of the supercapacitor is further related to an operational life of a device on which the storage system is configured. Therefore, a deviation from a rated capacitance value of the supercapacitor may be further determined according to the environmental temperature information and the operational life of the device (for example, if the rated capacitance value of the selected supercapacitor is 600 F, it is determined, according to the environmental temperature information and the operational life of the device, that the deviation from the rated capacitance value may be ±20%) in order to obtain that the capacitance value of the supercapacitor does not exceed the rated capacitance value by ±20%.

Step S508: Calculate a charging voltage of the supercapacitor according to the capacitance value and the power supply energy.

In specific implementation, it is assumed that the actual power supply energy obtained by performing integration on the power curve 1 is 797 joules, and the theoretical power supply energy obtained by performing integration on the power curve 2 is 1124 joules. If six supercapacitors are connected in series to provide power failure protection to the storage system, a charging voltage of each supercapacitor may be calculated using a formula:

$$Q = \frac{1}{2} \cdot C \cdot V^2,$$

where the capacitance value C is equal to a ratio of a capacitance value of the supercapacitor to n when the temperature of the environment is 60° C. and n is a quantity of supercapacitors connected in series, and V is equal to a product of multiplying the charging voltage of the supercapacitor by n. The calculation process belongs to other approaches, and details are not described in this embodiment of the present disclosure.

In specific implementation, as shown in FIG. 8, FIG. 8 is a schematic diagram of a curve of a charging voltage of a supercapacitor and power supply energy. A curve shown in FIG. 8 is a schematic diagram of a curve of the formula $$Q = \frac{1}{2} \cdot C \cdot V^2.$$

The charging voltage of the supercapacitor may be intuitively obtained using the schematic diagram of a curve in FIG. 8. It may be obtained from the schematic diagram of a curve that when the temperature of the environment in which the supercapacitor is located is 60° C., an actual charging voltage of the supercapacitor is 1.7 V if power supply energy (that is, actual power supply energy) is 797 joules, or a theoretical charging voltage of the supercapacitor is 1.9 V if power supply energy (that is, theoretical power supply energy) is 1124 joules. In this case, the actual charging voltage and the theoretical charging voltage of the supercapacitor are compared according to the relationship curve graph shown in FIG. 1, and it is obtained that the life of the supercapacitor is 7 years when the charging voltage is 1.7 V, and the life of the supercapacitor is only 3.5 years when the charging voltage is 1.9 V. Therefore, the life of the supercapacitor is doubled if the supercapacitor is charged according to the actual charging voltage.

Step S509: Charge the supercapacitor according to the determined charging voltage.

In specific implementation, the supercapacitor is charged according to an actual charging voltage charge such that the supercapacitor provides actual power supply energy to all the modules of the storage system according to the actual charging voltage when the storage system encounters the power failure.

In a possible implementation manner, as shown in a diagram of a circuit structure in FIG. 9, after charging voltages of supercapacitors are determined, an output voltage of a supercapacitor charging power supply may be adjusted using a resistance feedback circuit, and then the charging voltage is allocated to each supercapacitor according to the output voltage of the supercapacitor charging power supply, making a charging voltage of each supercapacitor be the charging voltage obtained by means of calculation in step S508. The resistance feedback circuit includes a resistor and an adjustable potentiometer. The supercapacitor charging power supply is an apparatus that can convert electric energy of a main power supply into electric energy of another form or specification in order to meet requirements of different electrical devices, and change an output voltage as needed.

By means of this embodiment of the present disclosure, sampling is performed in real time on powers that occur when modules are operating, to obtain at least one piece of second power information of each of the modules, and second power information that has a maximum power value in the at least one piece of second power information of each of the modules is selected as first power information or configuration information of each of the modules is obtained and first power information of each of the modules is obtained from the configuration information. A power failure sequence and power failure duration of each of the modules during a power failure are obtained. Power information of a storage system that occurs after each of the modules have encountered the power failure is obtained according to the first power information of the modules that are operating, and a power curve is obtained according to the power information of the storage system that is obtained after the modules have encountered the power failure and the power failure sequence and the power failure duration of the modules during the power failure. Then integration is performed on the power curve falling within the power failure duration of all the modules, to obtain actual power supply energy of the storage system, and finally a charging voltage of a supercapacitor is determined according to the power supply energy and a detected temperature of an environment in which the supercapacitor is located, and the supercapacitor is charged according to the determined charging voltage such that a life of the supercapacitor is prolonged.

Figure 10:
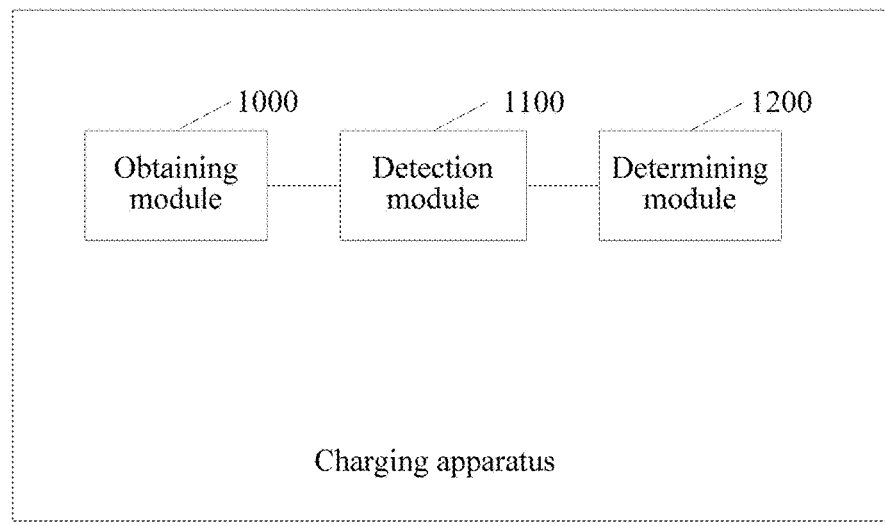
FIG. 10 is a schematic structural diagram of a charging apparatus according to an embodiment of the present disclosure.

Referring to FIG. 10, FIG. 10 is a schematic structural diagram of a charging apparatus according to an embodiment of the present disclosure. The charging apparatus shown in FIG. 10 includes an obtaining module 1000, a detection module 1100, and a determining module 1200.

The obtaining module 1000 is configured to obtain power supply energy needed by a storage system during a power failure.

The detection module 1100 is configured to detect a temperature of an environment in which a supercapacitor is located, to obtain environmental temperature information of the supercapacitor, where the supercapacitor is configured to provide the power supply energy to the storage system.

The determining module 1200 is configured to determine a charging voltage of the supercapacitor according to the environmental temperature information obtained by the detection module 1100 and the power supply energy calculated by the obtaining module 1000, and charge the supercapacitor according to the determined charging voltage.

In specific implementation, the power supply energy needed by the storage system during the power failure may be obtained using a baseboard management controller.

In a possible implementation manner, the baseboard management controller may detect in real time a power of a storage system during operation, to obtain at least one piece of power information, then select second power information that has a maximum power value in the obtained at least one piece of power information, and then obtain power failure duration of the storage system in order to obtain maximum power supply energy of the storage system during the power failure. Therefore, when the storage system encounters the power failure, the supercapacitor can support the maximum power supply energy that is actually needed by the storage system.

In a possible implementation manner, the baseboard management controller may obtain power information of the storage system from configuration information of the storage system. Further, an actual power of the storage system may be tested before the storage system is put into use, and a testing result is stored in the configuration information. Therefore, the configuration information may be obtained by reading information such as an electronic label on the storage system in order to obtain first power information of the storage system.

In a possible implementation manner, the storage system may include any type of module that needs power failure protection, for example, a module without using backup power (for example, a hard disk and a non-critical chip), an interface card module, a fan module, a coffer disk, and a storage control module (including a CPU, a memory, a communications chip, or the like). Therefore, first power information of each of the modules may be obtained, and power information of the storage system that is obtained after each of the modules have encountered the power failure is obtained according to the first power information of each of the modules. Then a power failure sequence of each of the modules and power failure duration of each of the modules are obtained, and a power curve is obtained according to the power information of the storage system that is obtained after each of the modules have encountered the power failure, the power failure sequence of each of the modules, and the power failure duration of each of the modules, and finally integration is performed on the power curve falling within the power failure duration of all the modules, to obtain the power supply energy needed by the storage system during the power failure.

In specific implementation, a temperature sensor may be placed around the supercapacitor, and the temperature sensor transfers the environmental temperature information to the baseboard management controller such that the environmental temperature information of the supercapacitor is obtained.

In specific implementation, because a capacitance value of the supercapacitor is related to the temperature of the environment in which the supercapacitor is located, the capacitance value of the supercapacitor may be calculated according to the environmental temperature information obtained by the baseboard management controller, and finally the charging voltage of the supercapacitor is calculated according to the capacitance value of the supercapacitor and the obtained power supply energy of each of the modules. After the charging voltage of the supercapacitor is obtained, an output voltage of a supercapacitor charging power supply is adjusted according to the determined charging voltage such that the power supply charges the supercapacitor according to the determined charging voltage.

Figure 11:
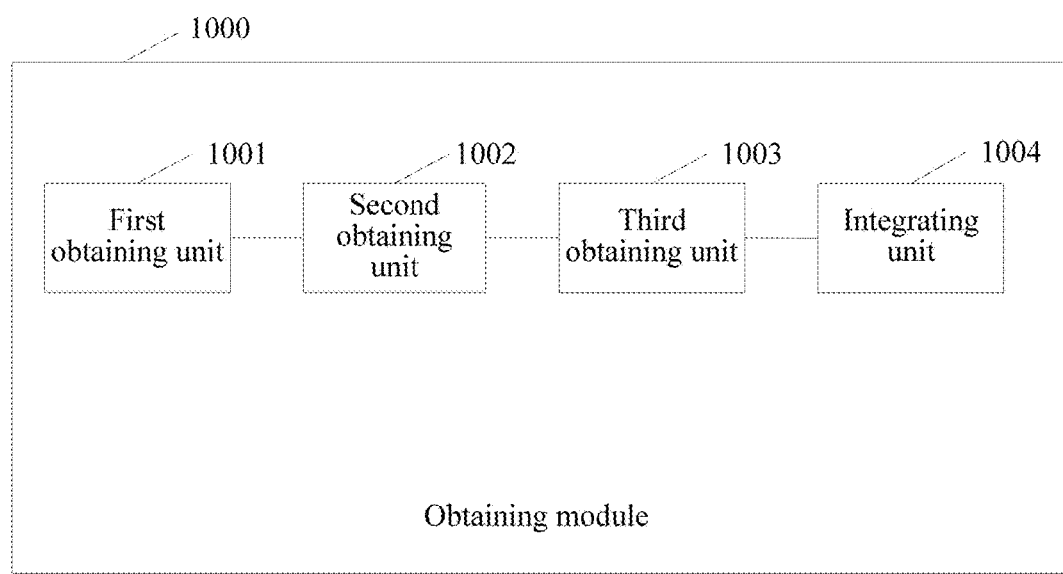
FIG. 11 is a schematic structural diagram of an obtaining module of a charging apparatus according to an embodiment of the present disclosure.

Optionally, as shown in FIG. 11, the obtaining module 1000 includes a first obtaining unit 1001, a second obtaining unit 1002, a third obtaining unit 1003, and an integrating unit 1004.

The first obtaining unit 1001 is configured to obtain first power information of each of modules in the storage system that are operating.

The second obtaining unit 1002 is configured to obtain a power failure sequence and power failure duration of each of the modules during the power failure.

The third obtaining unit 1003 is configured to obtain, according to the first power information, obtained by the first obtaining unit 1001, of each of the modules that are operating, power information of the storage system that is obtained after each of the modules have encountered the power failure, and obtain a power curve according to the power information of the storage system that is obtained after each of the modules have encountered the power failure and the power failure sequence and the power failure duration of each of the modules during the power failure that are obtained by the second obtaining unit 1002.

The integrating unit 1004 is configured to perform integration on the power curve falling within the power failure duration of all the modules, to obtain the power supply energy.

Optionally, the first obtaining unit 1001 includes a sampling subunit (not shown in the figure) and a selection subunit (not shown in the figure).

The sampling subunit is configured to sample powers of the modules that are operating, to obtain at least one piece of second power information of the modules.

The selection subunit is configured to select, second power information that has a maximum power value in the at least one piece of second power information of each of the modules that is obtained by the sampling subunit, as the first power information of each of the modules.

In specific implementation, the first power information of each of modules in the storage system that are operating may be obtained, where an obtaining manner may be sampling the powers of each of the modules that are operating, to obtain the at least one piece of second power information of each of the modules. As shown in FIG. 6, sampling may be performed in real time, using an I2C interface of a baseboard management controller, on the powers of the modules that are operating in order to obtain the at least one piece of second power information of each module. This embodiment is described using an example in which the modules are respectively a module without using backup power, a fan module, an interface card module, and a storage control module such as a CPU. Using the fan module as an example, the baseboard management controller may perform sampling in real time on a power of the fan module during operation when the fan module is operating, to obtain at least one piece of second power information of the fan module, and store the at least one piece of second power information in a preset real-time power table.

In a possible implementation manner, as shown in FIG. 6, a power detection circuit may be further disposed on the modules that need power failure protection, to detect powers of the modules in a current operating scenario, and then the I2C interface of the baseboard management controller reads real-time powers that are of the modules and that are detected by the power detection circuit.

In specific implementation, after the at least one piece of second power information of each of the modules included in the storage system is stored in the preset real-time power table, the at least one piece of second power information stored in the modules is compared with each other, and the second power information that has a maximum power value in the at least one piece of second power information stored in the modules is selected as the first power information. Therefore, when the storage system encounters the power failure, the supercapacitor can support maximum power supply energy that is actually needed by all the modules in the storage system.

In specific implementation, as shown in FIG. 7, FIG. 7 is a schematic diagram of a power curve according to an embodiment of the present disclosure. In this embodiment of the present disclosure, the first power information of each of the modules that is obtained by sampling the powers of each of the modules during operation is as follows. A power in the first power information of the module without using backup power is 270 watts, a power in the first power information of the fan module is 90 watts, a power in the first power information of the interface card module is 125 watts, and a power in the first power information of the storage control module is 40 watts.

In a possible implementation manner, in other approaches, powers of each of the modules in the storage system are obtained by means of theoretical calculation when each of the modules is operating in full load. Therefore, first power information of each of the modules that is obtained by means of theoretical calculation is as follows. The power in the first power information of the module without using backup power is 310 watts, the power in the first power information of the fan module is 110 watts, the power in the first power information of the interface card module is 144 watts, and the power in the first power information of the storage control module is 45 watts.

In specific implementation, to calculate power supply energy of the modules, the power failure duration of the modules needs to be obtained. The power failure duration is a time interval from a time point when a module encounters a power failure to a time point when the module is turned off. For example, as shown in FIG. 7, power failure duration of the module without using backup power is approximately 0.01 second, power failure duration of the fan module is approximately 0.06 second, power failure duration of the interface card module and a power supply of the interface card module is approximately 5 seconds, an underclocking time of the storage control module such as the CPU after the power failure occurs is approximately 3 seconds, and a time from a time point when the CPU transfers data in the memory to the coffer disk to a time point when the CPU has transferred the data is approximately 17 seconds.

In specific implementation, the obtained power failure sequence of the modules during the power failure is as follows. Within a time from the $0^{th}$ second to the $0.01^{th}$ second, power consumption of the storage system starts to reduce rapidly, and the module without using backup power starts to be turned off, where mainly hardware modules without power failure protection such as a hard disk and a non-critical chip of an external interface are turned off. Within a time from the $0.01^{th}$ second to the $0.07^{th}$ second, the fan module is turned off, and in this case, the power of the fan module is gradually reduced to 0. Within a time from the $0.07^{th}$ second to the $5^{th}$ second, the interface card module is unloaded, and the power supply of the interface card module is turned off. Within a time from the $5^{th}$ second to the $8^{th}$ second, the storage control module such as the CPU starts to be underclocked, to reduce an overall power of the storage system. Within a time from the $8^{th}$ second to the $25^{th}$ second, the CPU starts to transfer the data from the memory to the coffer disk.

In specific implementation, sorting is performed according to the power failure sequence of the modules, the power information of the storage system that is obtained after the modules have encountered the power failure is obtained according to powers in the obtained first power information of the modules, and then the power curve shown in FIG. 7 is obtained according to the power information of the storage system that is obtained after the modules have encountered the power failure and the power failure duration of the modules.

In specific implementation, a power failure end time of each module corresponds to power information of the storage system that is obtained after the modules have encountered the power failure, and finally a power curve 1 of the entire storage system is obtained. Referring to the power curve 1 in FIG. 7, after sampling is performed on the powers of the modules that are operating to obtain the powers in the first power information of the modules, the power of the storage system after the modules have encountered the power failure is as follows. An actual power that is obtained by the baseboard management controller through detection and that is of the storage system before the power failure occurs is 550 watts. The actual power of the storage system is reduced to 280 watts after the module without using backup power (such as the hard disk and the non-critical chip) is turned off. The actual power of the storage system is reduced to 190 watts after the fan module is turned off. The actual power of the storage system is reduced to 65 watts after the external interface such as the interface card module is turned off. The actual power of the storage system is eventually reduced to 25 watts when the storage control module such as the CPU is underclocked and starts to transfer the data from the memory to the coffer disk.

In a possible implementation manner, a power curve 2 that exists when the entire storage system operates in full load may be further obtained according to the power failure end time of each module and powers of the modules operating in full load that are obtained by means of theoretical calculation. Referring to the power curve 2 in FIG. 7, a full-load power that is obtained by means of theoretical calculation and that is of the storage system before the power failure occurs is 650 watts. The power of the storage system is reduced to 340 watts after the module without using backup power (such as the hard disk and the non-critical chip) is turned off. The power of the storage system is reduced to 230 watts after the fan module is turned off. The power of the storage system is reduced to 86 watts after the external interface such as the interface card module is turned off. The power of the storage system is reduced to 41 watts when the storage control module such as the CPU is underclocked and starts to transfer the data from the memory to the coffer disk. Therefore, it may be seen from FIG. 7 that an overall power of the power curve 1 is lower than an overall power of the power curve 2. Actual powers that are obtained by sampling the power of each of the modules during operation and that are of the modules are all lower than powers that are obtained by means of calculation and that are of the modules operating in full load. After the modules have encountered the power failure, an actual power of the storage system is also lower than a power of the system operating in full load.

In specific implementation, a total power failure duration of the power curve 1 shown in FIG. 7 is 25 seconds. Therefore, integration is performed on the power curve 1 falling within the 25 seconds, to obtain actual power supply energy of the storage system. The actual power supply energy is power supply energy provided by the supercapacitor.

In a possible implementation manner, integration may also be performed on the power curve 2 falling within the 25 seconds, to obtain theoretical power supply energy of the storage system. Performing integration on a curve falling within a determined range belongs to other approaches, and details are not described in this embodiment of the present disclosure.

Optionally, the first obtaining unit 1001 includes an obtaining subunit (not shown in the figure).

The obtaining subunit is configured to obtain configuration information of the modules, and obtain the first power information of the modules from the configuration information of the modules.

In specific implementation, the first power information of modules in the storage system that are operating may be obtained, where an obtaining manner may include obtaining the configuration information of the modules, and obtaining first power information of the modules from the configuration information of the modules. Further, actual powers of the modules may be tested before the storage system is put into use, and a testing result is stored in the configuration information. Units such as CPUs, memories, and communications chips that are configured on storage control modules of different storage systems are different. For example, at least one type of unit of a CPU, a memory, a communications chip or a storage unit may be flexibly configured on a storage control module. Therefore, in this case, real-time powers of the storage control module having different configurations may be detected before the storage control module is put into use, that is, real-time powers of the storage control module on which different CPUs, different memories or different storage units are configured are detected, and first power information of units is generated, and finally, the first power information of the units is stored in configuration information. Optionally, a sum of detected powers of units on the storage control module may also be used as first power information of the storage control module, and the first power information is stored in configuration information.

In a possible implementation manner, powers of the module without using backup power, the fan module, the coffer disk, and another module may be further detected, first power information of the modules is similarly generated, and the first power information of the modules is stored in configuration information. The configuration information may be obtained by reading information such as an electronic label on the storage system in order to obtain the first power information of the modules when the first power information of the modules needs to be obtained.

Figure 12:
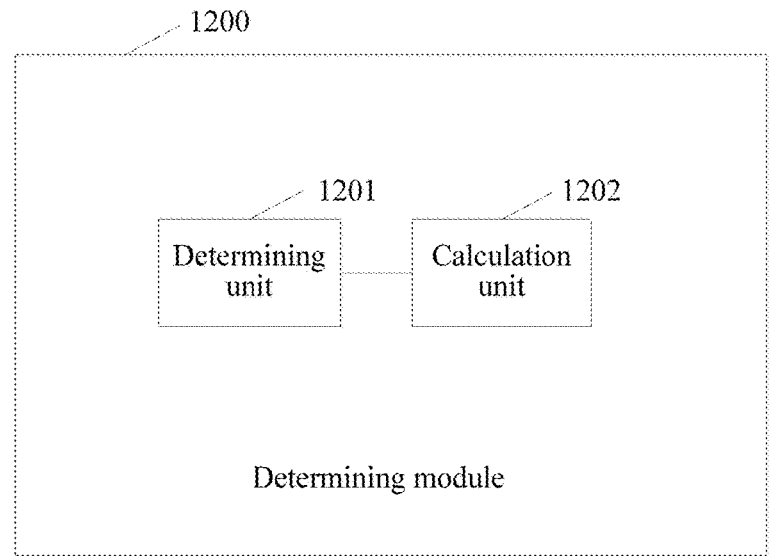
FIG. 12 is a schematic structural diagram of a determining module of a charging apparatus according to an embodiment of the present disclosure.

Optionally, as shown in FIG. 12, the determining module 1200 includes a determining unit 1201 and a calculation unit 1202.

The determining unit 1201 is configured to determine a capacitance value of the supercapacitor according to the environmental temperature information obtained by the detection module 1100 in FIG. 10.

The calculation unit 1202 is configured to calculate the charging voltage of the supercapacitor according to the capacitance value determined by the determining unit 1201 and the power supply energy calculated by the obtaining module 1000 in FIG. 10.

In specific implementation, determining the capacitance value of the supercapacitor according to the temperature of the environment in which the supercapacitor is located belongs to other approaches, and details are not described in this embodiment of the present disclosure.

In a possible implementation manner, the capacitance value of the supercapacitor is further related to an operational life of a device on which the storage system is configured. Therefore, a deviation from a rated capacitance value of the supercapacitor may be further determined according to the environmental temperature information and the operational life of the device (for example, if the rated capacitance value of the selected supercapacitor is 600 F, it is determined, according to the environmental temperature information and the operational life of the device, that the deviation from the rated capacitance value may be ±20%) in order to obtain that the capacitance value of the supercapacitor does not exceed the rated capacitance value by ±20%.

In specific implementation, it is assumed that the actual power supply energy obtained by performing integration on the power curve 1 is 797 joules, and the theoretical power supply energy obtained by performing integration on the power curve 2 is 1124 joules. If six supercapacitors are connected in series to provide power failure protection to the storage system, a charging voltage of each supercapacitor may be calculated using a formula:

$$Q = \frac{1}{2} \cdot C \cdot V^2,$$

where the capacitance value C is equal to a ratio of a capacitance value of the supercapacitor to n when the temperature of the environment is 60° C. and n is a quantity of supercapacitors connected in series, and V is equal to a product of multiplying the charging voltage of the supercapacitor by n). The calculation process belongs to other approaches, and details are not described in this embodiment of the present disclosure.

In specific implementation, as shown in FIG. 8, FIG. 8 is a schematic diagram of a curve of a charging voltage of a supercapacitor and power supply energy. A curve shown in FIG. 8 is a schematic diagram of a curve of the formula $$Q = \frac{1}{2} \cdot C \cdot V^2.$$

The charging voltage of the supercapacitor may be intuitively obtained using the schematic diagram of a curve in FIG. 8. It may be obtained from the schematic diagram of a curve that when the temperature of the environment in which the supercapacitor is located is 60° C., an actual charging voltage of the supercapacitor is 1.7 V if power supply energy (that is, actual power supply energy) is 797 joules, or a theoretical charging voltage of the supercapacitor is 1.9 V if power supply energy (that is, theoretical power supply energy) is 1124 joules. In this case, the actual charging voltage and the theoretical charging voltage of the supercapacitor are compared according to the relationship curve graph shown in FIG. 1, and it is obtained that the life of the supercapacitor is 7 years when the charging voltage is 1.7 V, and the life of the supercapacitor is only 3.5 years when the charging voltage is 1.9 V. Therefore, the life of the supercapacitor is doubled if the supercapacitor is charged according to the actual charging voltage.

By means of this embodiment of the present disclosure, sampling is performed in real time on powers that occur when modules are operating, to obtain at least one piece of second power information of the modules is obtained, and second power information that has a maximum power value in the at least one piece of second power information of the modules is selected as first power information or configuration information of the modules is obtained and first power information of the modules is obtained from the configuration information, a power failure sequence and power failure duration of the modules during a power failure are obtained, power information of a storage system that occurs after the modules have encountered the power failure is obtained according to the first power information of the modules that are operating, and a power curve is obtained according to the power information of the storage system that is obtained after the modules have encountered the power failure and the power failure sequence and the power failure duration of the modules during the power failure. Then integration is performed on the power curve falling within the power failure duration of all the modules, to obtain actual power supply energy of the storage system, and finally a charging voltage of a supercapacitor is determined according to the power supply energy and a detected temperature of an environment in which the supercapacitor is located, and the supercapacitor is charged according to the determined charging voltage such that a life of the supercapacitor is prolonged.

Figure 13:
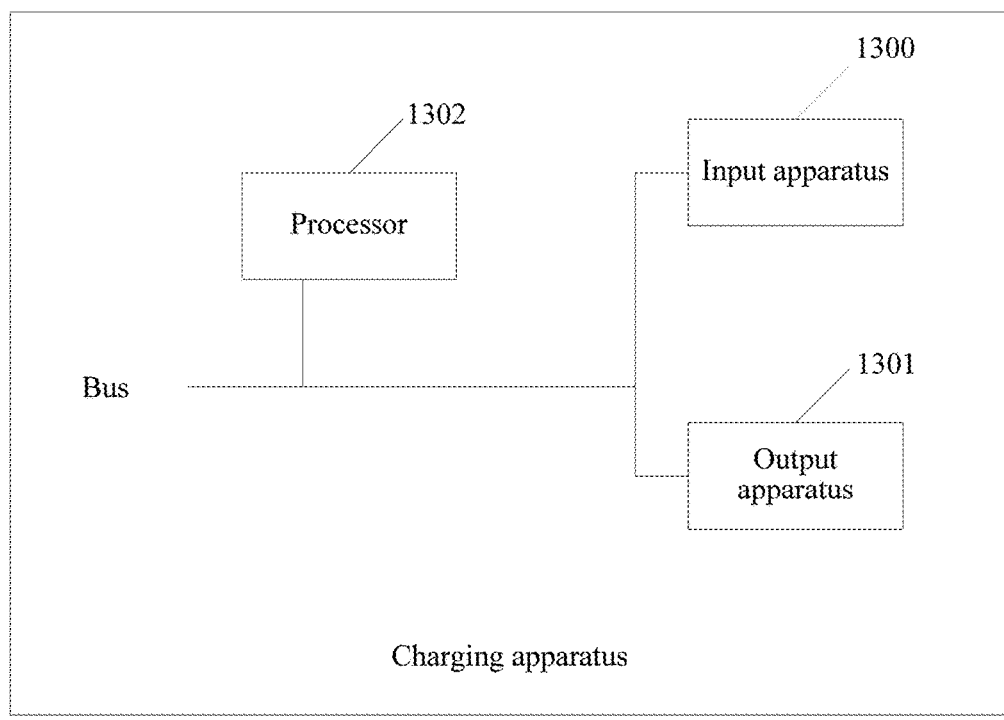
FIG. 13 is a schematic structural diagram of another charging apparatus according to an embodiment of the present disclosure.

Referring to FIG. 13, FIG. 13 is a schematic structural diagram of another charging apparatus according to an embodiment of the present disclosure. The charging apparatus shown in FIG. 13 includes an input apparatus 1300, an output apparatus 1301, and a processor 1302 (where a quantity of processors of the charging apparatus may be one or more, and one processor is used as an example in FIG. 13). In this embodiment of the present disclosure, the input apparatus 1300, the output apparatus 1301, and the processor 1302 may be connected using a bus or in another manner, where a bus connection is used as an example in FIG. 13.

The input apparatus 1300 is configured to obtain power supply energy needed by a storage system during a power failure.

The input apparatus 1300 is configured to detect a temperature of an environment in which a supercapacitor is located, to obtain environmental temperature information of the supercapacitor, where the supercapacitor is configured to provide the power supply energy to the storage system.

The output apparatus 1301 is configured to determine a charging voltage of the supercapacitor according to the environmental temperature information and the power supply energy, and charge the supercapacitor according to the determined charging voltage.

In specific implementation, the power supply energy needed by the storage system during the power failure may be obtained using a baseboard management controller.

In a possible implementation manner, the baseboard management controller may detect in real time a power of a storage system during operation, to obtain at least one piece of power information, then select second power information that has a maximum power value in the obtained at least one piece of power information, and then obtain power failure duration of the storage system in order to obtain maximum power supply energy of the storage system during the power failure. Therefore, when the storage system encounters the power failure, the supercapacitor can support the maximum power supply energy that is actually needed by the storage system.

In a possible implementation manner, the baseboard management controller may obtain power information of the storage system from configuration information of the storage system. Further, an actual power of the storage system may be tested before the storage system is put into use, and a testing result is stored in the configuration information. Therefore, the configuration information may be obtained by reading information such as an electronic label on the storage system in order to obtain first power information of the storage system.

In a possible implementation manner, the storage system may include any type of module that needs power failure protection, for example, a module without using backup power such as a hard disk and a non-critical chip, an interface card module, a fan module, a coffer disk, and a storage control module (including a CPU, a memory, a communications chip, or the like). Therefore, first power information of the modules may be obtained, and power information of the storage system that is obtained after the modules have encountered the power failure is obtained according to the first power information of the modules. Then a power failure sequence of the modules and power failure duration of the modules are obtained, and a power curve is obtained according to the power information of the storage system that is obtained after the modules have encountered the power failure, the power failure sequence of the modules, and the power failure duration of the modules, and finally integration is performed on the power curve falling within the power failure duration of all the modules, to obtain the power supply energy needed by the storage system during the power failure.

In specific implementation, a temperature sensor may be placed around the supercapacitor, and the temperature sensor transfers the environmental temperature information to the baseboard management controller such that the environmental temperature information of the supercapacitor is obtained.

In specific implementation, because a capacitance value of the supercapacitor is related to the temperature of the environment in which the supercapacitor is located, the capacitance value of the supercapacitor may be calculated according to the environmental temperature information obtained by the baseboard management controller, and finally the charging voltage of the supercapacitor is calculated according to the capacitance value of the supercapacitor and the obtained power supply energy of the modules. After the charging voltage of the supercapacitor is obtained, an output voltage of a supercapacitor charging power supply is adjusted according to the determined charging voltage such that the power supply charges the supercapacitor according to the determined charging voltage.

Optionally, the input apparatus 1300 is further configured to obtain first power information of each of modules in the storage system that is operating.

The input apparatus 1300 is further configured to obtain a power failure sequence and power failure duration of each of the modules during the power failure.

The input apparatus 1300 is further configured to obtain, according to the first power information of each of the modules that are operating, power information of the storage system that is obtained after each of the modules have encountered the power failure, and obtain a power curve according to the power information of the storage system that is obtained after each of the modules have encountered the power failure and the power failure sequence and the power failure duration of each of the modules during the power failure.

The processor 1302 is further configured to perform integration on the power curve falling within the power failure duration of all the modules, to obtain the power supply energy.

Optionally, the input apparatus 1300 is further configured to sample powers of the modules that are operating, to obtain at least one piece of second power information of the modules, and select, second power information that has a maximum power value in the at least one piece of second power information of the modules, as the first power information of the modules.

In specific implementation, the first power information of each of modules in the storage system that are operating may be obtained, where an obtaining manner may be sampling the power of each of the modules that are operating, to obtain the at least one piece of second power information of the modules. As shown in FIG. 6, sampling may be performed in real time, using an I2C interface of a baseboard management controller, on the powers of the modules that are operating in order to obtain the at least one piece of second power information of each module. This embodiment is described using an example in which the modules are respectively a module without using backup power, a fan module, an interface card module, and a storage control module such as a CPU. Using the fan module as an example, the baseboard management controller may perform sampling in real time on a power of the fan module during operation when the fan module is operating, to obtain at least one piece of second power information of the fan module, and store the at least one piece of second power information in a preset real-time power table.

In specific implementation, after the at least one piece of second power information of the modules included in the storage system is stored in the preset real-time power table, the at least one piece of second power information stored in the modules is compared with each other, and the second power information that has a maximum power value in the at least one piece of second power information stored in the modules is selected as the first power information. Therefore, a supercapacitor can support maximum power supply energy that is actually needed by all the modules in the storage system when the storage system encounters the power failure.

In specific implementation, as shown in FIG. 7, FIG. 7 is a schematic diagram of a power curve according to an embodiment of the present disclosure. In this embodiment of the present disclosure, the first power information of each of the modules that is obtained by sampling the power of each of the modules during operation is as follows. A power in the first power information of the module without using backup power is 270 watts, a power in the first power information of the fan module is 90 watts, a power in the first power information of the interface card module is 125 watts, and a power in the first power information of the storage control module is 40 watts.

In a possible implementation manner, in other approaches, powers of the modules in the storage system are obtained by means of theoretical calculation when the modules are operating in full load. Therefore, first power information of the modules that is obtained by means of theoretical calculation is as follows. The power in the first power information of the module without using backup power is 310 watts, the power in the first power information of the fan module is 110 watts, the power in the first power information of the interface card module is 144 watts, and the power in the first power information of the storage control module is 45 watts.

In specific implementation, to calculate power supply energy of the modules, the power failure duration of the modules needs to be obtained. The power failure duration is a time interval from a time point when a module encounters a power failure to a time point when the module is turned off. For example, as shown in FIG. 7, power failure duration of the module without using backup power is approximately 0.01 second, power failure duration of the fan module is approximately 0.06 second, power failure duration of the interface card module and a power supply of the interface card module is approximately 5 seconds, an underclocking time of the storage control module such as the CPU after the power failure occurs is approximately 3 seconds, and a time from a time point when the CPU transfers data in the memory to the coffer disk to a time point when the CPU has transferred the data is approximately 17 seconds.

In specific implementation, the obtained power failure sequence of the modules during the power failure is as follows. Within a time from the $0^{th}$ second to the $0.01^{th}$ second, power consumption of the storage system starts to reduce rapidly, and the module without using backup power starts to be turned off, where mainly hardware modules without power failure protection such as a hard disk and a non-critical chip of an external interface are turned off. Within a time from the $0.01^{th}$ second to the $0.07^{th}$ second, the fan module is turned off, and in this case, the power of the fan module is gradually reduced to 0. Within a time from the $0.07^{th}$ second to the $5^{th}$ second, the interface card module is unloaded, and the power supply of the interface card module is turned off. Within a time from the $5^{th}$ second to the $8^{th}$ second, the storage control module such as the CPU starts to be underclocked, to reduce an overall power of the storage system. Within a time from the $8^{th}$ second to the $25^{th}$ second, the CPU starts to transfer the data from the memory to the coffer disk.

In specific implementation, sorting is performed according to the power failure sequence of the modules, the power information of the storage system that is obtained after the modules have encountered the power failure is obtained according to powers in the obtained first power information of the modules, and then the power curve shown in FIG. 7 is obtained according to the power information of the storage system that is obtained after the modules have encountered the power failure and the power failure duration of the modules.

In specific implementation, a power failure end time of each module corresponds to power information of the storage system that is obtained after the modules have encountered the power failure, and finally the power curve 1 of the entire storage system is obtained. Referring to the power curve 1 in FIG. 7, after sampling is performed on the powers of the modules that are operating to obtain the powers in the first power information of the modules, the power of the storage system after the modules have encountered the power failure is as follows. An actual power that is obtained by the baseboard management controller through detection and that is of the storage system before the power failure occurs is 550 watts. The actual power of the storage system is reduced to 280 watts after the module without using backup power (such as the hard disk and the non-critical chip) is turned off. The actual power of the storage system is reduced to 190 watts after the fan module is turned off. The actual power of the storage system is reduced to 65 watts after the external interface such as the interface card module is turned off. The actual power of the storage system is eventually reduced to 25 watts when the storage control module such as the CPU is underclocked and starts to transfer the data from the memory to the coffer disk.

In a possible implementation manner, a power curve 2 that exists when the entire storage system operates in full load may be further obtained according to the power failure end time of each module and powers of the modules operating in full load that are obtained by means of theoretical calculation. Referring to the power curve 2 in FIG. 7, a full-load power that is obtained by means of theoretical calculation and that is of the storage system before the power failure occurs is 650 watts. The power of the storage system is reduced to 340 watts after the module without using backup power (such as the hard disk and the non-critical chip) is turned off. The power of the storage system is reduced to 230 watts after the fan module is turned off. The power of the storage system is reduced to 86 watts after the external interface such as the interface card module is turned off. The power of the storage system is reduced to 41 watts when the storage control module such as the CPU is underclocked and starts to transfer the data from the memory to the coffer disk. Therefore, it may be seen from FIG. 7 that an overall power of the power curve 1 is lower than an overall power of the power curve 2. Actual powers that are obtained by sampling the powers of the modules during operation and that are of the modules are all lower than powers that are obtained by means of calculation and that are of the modules operating in full load. After the modules have encountered the power failure, an actual power of the storage system is also lower than a power of the system operating in full load.

In specific implementation, a total power failure duration of the power curve 1 shown in FIG. 7 is 25 seconds. Therefore, integration is performed on the power curve 1 falling within the 25 seconds, to obtain actual power supply energy of the storage system. The actual power supply energy is power supply energy provided by the supercapacitor.

In a possible implementation manner, integration may also be performed on the power curve 2 falling within the 25 seconds, to obtain theoretical power supply energy of the storage system. Performing integration on a curve falling within a determined range belongs to other approaches, and details are not described in this embodiment of the present disclosure.

Optionally, the input apparatus 1300 is further configured to obtain configuration information of the modules, and obtain the first power information of the modules from the configuration information of the modules.

In specific implementation, the first power information of modules in the storage system that are operating may be obtained, where an obtaining manner may be obtaining the configuration information of the modules, and obtaining first power information of the modules from the configuration information of the modules. Further, actual powers of the modules may be tested before the storage system is put into use, and a testing result is stored in the configuration information. Units such as CPUs, memories, and communications chips that are configured on storage control modules of different storage systems are different. For example, at least one type of unit of a CPU, a memory, a communications chip or a storage unit may be flexibly configured on a storage control module. Therefore, in this case, real-time powers of the storage control module having different configurations may be detected before the storage control module is put into use, that is, real-time powers of the storage control module on which different CPUs, different memories or different memories or different storage units are configured are detected, and first power information of units is generated, and finally, the first power information of the units is stored in configuration information. Optionally, a sum of detected powers of units on the storage control module may also be used as first power information of the storage control module, and the first power information is stored in configuration information.

In a possible implementation manner, powers of the module without using backup power, the fan module, the coffer disk, and another module may be further detected, first power information of the modules is similarly generated, and the first power information of the modules is stored in configuration information. The configuration information may be obtained by reading information such as an electronic label on the storage system in order to obtain the first power information of the modules when the first power information of the modules needs to be obtained.

Optionally, the processor 1302 is further configured to determine a capacitance value of the supercapacitor according to the environmental temperature information, and calculate the charging voltage of the supercapacitor according to the capacitance value and the power supply energy.

In specific implementation, determining the capacitance value of the supercapacitor according to the temperature of the environment in which the supercapacitor is located belongs to other approaches, and details are not described in this embodiment of the present disclosure.

In a possible implementation manner, the capacitance value of the supercapacitor is further related to an operational life of a device on which the storage system is configured. Therefore, a deviation from a rated capacitance value of the supercapacitor may be further determined according to the environmental temperature information and the operational life of the device (for example, if the rated capacitance value of the selected supercapacitor is 600 F, it is determined, according to the environmental temperature information and the operational life of the device, that the deviation from the rated capacitance value may be ±20%) in order to obtain that the capacitance value of the supercapacitor does not exceed the rated capacitance value by ±20%.

In specific implementation, it is assumed that the actual power supply energy obtained by performing integration on the power curve 1 is 797 joules, and the theoretical power supply energy obtained by performing integration on the power curve 2 is 1124 joules. If six supercapacitors are connected in series to provide power failure protection to the storage system, a charging voltage of each supercapacitor may be calculated using a formula:

$$Q = \frac{1}{2} \cdot C \cdot V^2,$$

where the capacitance value C is equal to a ratio of a capacitance value of the supercapacitor to n when the temperature of the environment is 60° C. and n is a quantity of supercapacitors connected in series, and V is equal to a product of multiplying the charging voltage of the supercapacitor by n. The calculation process belongs to other approaches, and details are not described in this embodiment of the present disclosure.

In specific implementation, as shown in FIG. 8, FIG. 8 is a schematic diagram of a curve of a charging voltage of a supercapacitor and power supply energy. A curve shown in FIG. 8 is a schematic diagram of a curve of the formula $$Q = \frac{1}{2} \cdot C \cdot V^2.$$

The charging voltage of the supercapacitor may be intuitively obtained using the schematic diagram of a curve in FIG. 8. It may be obtained from the schematic diagram of a curve that when the temperature of the environment in which the supercapacitor is located is 60° C., an actual charging voltage of the supercapacitor is 1.7 V if power supply energy (that is, actual power supply energy) is 797 joules, or a theoretical charging voltage of the supercapacitor is 1.9 V if power supply energy (that is, theoretical power supply energy) is 1124 joules. In this case, the actual charging voltage and the theoretical charging voltage of the supercapacitor are compared according to the relationship curve graph shown in FIG. 1, and it is obtained that the life of the supercapacitor is 7 years when the charging voltage is 1.7 V, and the life of the supercapacitor is only 3.5 years when the charging voltage is 1.9 V. Therefore, the life of the supercapacitor is doubled if the supercapacitor is charged according to the actual charging voltage.

By means of this embodiment of the present disclosure, sampling is performed in real time on powers that occur when modules are operating, to obtain at least one piece of second power information of the modules is obtained, and second power information that has a maximum power value in the at least one piece of second power information of the modules is selected as first power information or configuration information of the modules is obtained and first power information of the modules is obtained from the configuration information. A power failure sequence and power failure duration of the modules during a power failure are obtained. Power information of a storage system that occurs after the modules have encountered the power failure is obtained according to the first power information of the modules that are operating, and a power curve is obtained according to the power information of the storage system that is obtained after the modules have encountered the power failure and the power failure sequence and the power failure duration of the modules during the power failure. Then integration is performed on the power curve falling within the power failure duration of all the modules, to obtain actual power supply energy of the storage system, and finally a charging voltage of a supercapacitor is determined according to the power supply energy and a detected temperature of an environment in which the supercapacitor is located, and the supercapacitor is charged according to the determined charging voltage such that a life of the supercapacitor is prolonged.

The apparatus embodiments described above are merely examples. The units that are described as separate storage systems may be or may not be physically separated. The storage systems shown as units may be or may not be physical units, that is, may be located in one position, or may be distributed on multiple network units. Some or all the modules may be selected according to actual needs to achieve the objectives of the solutions of the embodiments. A person of ordinary skill in the art may understand and implement the embodiments of the present disclosure without creative efforts.

A sequence of the steps of the method in the embodiments of the present disclosure may be adjusted, and certain steps may also be merged or removed according to an actual need.

Merging, division, and removing may be performed on the modules or the units in the apparatus in the embodiments of the present disclosure according to an actual need.

The modules in the embodiments of the present disclosure may be implemented using a common integrated circuit such as a CPU or an application-specific integrated circuit (ASIC).

Based on the foregoing descriptions of the embodiments, a person skilled in the art may clearly understand that each implementation manner may be implemented by software in addition to a necessary general hardware platform or by hardware. Based on such an understanding, the foregoing technical solutions essentially or the part may be implemented in a form of a software product. The software product is stored in a computer readable storage medium, such as a read-only memory (ROM), random access memory (RAM), a hard disk, or an optical disc, and includes several instructions for instructing a computer device (which may be a personal computer, a server, a network device, or the like) to perform the methods described in the embodiments or some parts of the embodiments.

The foregoing implementation manners are not intended to limit the protection scope of the technical solutions. Any modification, equivalent replacement, and improvement made without departing from the spirit and principle of the foregoing implementation manners shall fall within the protection scope of the technical solutions.

What is claimed is:

1. A charging method, comprising:
   obtaining a power failure sequence and a power failure duration of a plurality of devices during a power failure;
   obtaining power information of a storage system after the devices have encountered the power failure;
   obtaining a power curve according to the power failure sequence, the power failure duration, and the power information of the storage system;
   performing integration on the power curve falling within the power failure duration of all the devices to obtain a power supply energy;
   detecting a temperature of an environment in which a supercapacitor is located in order to obtain environmental temperature information of the supercapacitor, the supercapacitor being configured to provide the power supply energy to the storage system;
   determining a charging voltage of the supercapacitor according to the environmental temperature information and the power supply energy; and
   charging the supercapacitor according to the charging voltage.

2. The charging method of claim 1, further comprising:
   obtaining a first power information of each of devices operating in the storage system, the power curve being obtained according to the first power information.

3. The charging method of claim 2, wherein obtaining the first power information of each of the devices comprises:
   sampling powers of each of the devices in order to obtain at least one piece of second power information of each of the devices; and
   selecting, from the at least one piece of second power information of each of the devices, second power information comprising a maximum power value as the first power information of each of the devices.

4. The charging method of claim 2, wherein obtaining the first power information of each of the devices comprises:
   obtaining configuration information of each of the devices; and
   obtaining the first power information of each of the devices from the configuration information of each of the devices.

5. The charging method of claim 1, wherein determining the charging voltage of the supercapacitor comprises:
   determining a capacitance value of the supercapacitor according to the environmental temperature information; and
   calculating the charging voltage of the supercapacitor according to the capacitance value and the power supply energy.

6. A charging apparatus, comprising:
   a processor, and
   a non-transitory computer-readable storage medium coupled to the processor and configured to store programming instructions for execution by the processor, the programming instructions instructing the processor to:
     obtain a power failure sequence and a power failure duration of a plurality of devices during a power failure;
     obtain power information of a storage system after the devices have encountered the power failure;
     obtain a power curve according to the power failure sequence, the power failure duration, and the power information of the storage system;
     perform integration on the power curve falling within the power failure duration of all the devices to obtain a power supply energy;
     detect a temperature of an environment in which a supercapacitor is located in order to obtain environmental temperature information of the supercapacitor, the supercapacitor being configured to provide the power supply energy to the storage system;
     determine a charging voltage of the supercapacitor according to the environmental temperature information and the power supply energy, and
     charge the supercapacitor according to the charging voltage.

7. The charging apparatus of claim 6, wherein the programming instructions further instruct the processor to obtain a first power information of each of devices operating in the storage system, the power curve being obtained according to the first power information.

8. The charging apparatus of claim 7, wherein when obtaining the first power information of each of the devices, the programming instructions further instruct the processor to:
   sample powers of each of the devices in order to obtain at least one piece of second power information of each of the devices; and
   select, from the at least one piece of second power information of each of the devices, second power information comprising a maximum power value as the first power information of each of the devices.

9. The charging apparatus of claim 7, wherein when obtaining the first power information of each of the devices, the programming instructions further instruct the processor to:
   obtain configuration information of each of the devices; and obtain the first power information of each of the devices from the configuration information of each of the devices.

10. The charging apparatus of claim 6, wherein when determining the charging voltage of the supercapacitor, the programming instructions further instruct the processor to:
    determine a capacitance value of the supercapacitor according to the environmental temperature information; and
    calculate the charging voltage of the supercapacitor according to the capacitance value and the power supply energy.

* * * * *